FREEZE DRYING METHOD AND APPARATUS THEREFOR

Filed Jan. 3, 1969

6 Sheets-Sheet 1

INVENTOR.
THEODORE R. FOLSOM

BY J. W. Anderson
C. E. Tripp

ATTORNEYS

INVENTOR.
THEODORE R. FOLSOM

BY F. W. Anderson
C. E. Tripp

ATTORNEYS

INVENTOR.
THEODORE R. FOLSOM

BY F. W. Anderson
C. E. Tripp

ATTORNEYS

FREEZE DRYING METHOD AND APPARATUS THEREFOR

Filed Jan. 3, 1969

6 Sheets-Sheet 4

INVENTOR.
THEODORE R. FOLSOM

BY J. W. Anderson
C. E. Tripp

ATTORNEYS

INVENTOR.
THEODORE R. FOLSOM

BY F. W. Anderson
C. E. Tripp
ATTORNEYS

INVENTOR.
THEODORE R. FOLSOM

BY F.W. Anderson
C.E. Tripp

ATTORNEYS

United States Patent Office 3,583,075
Patented June 8, 1971

3,583,075
FREEZE DRYING METHOD AND APPARATUS THEREFOR

Theodore Robert Folsom, La Jolla, Calif., assignor to FMC Corporation, San Jose, Calif.

Filed Jan. 3, 1969, Ser. No. 788,810
Int. Cl. F26b *5/06*
U.S. Cl. 34—5 23 Claims

ABSTRACT OF THE DISCLOSURE

Freeze drying is accomplished by freezing a substance having a small amount of a material added thereto to prevent collapse of the matrix of the substance. The freezing occurs in a freeze chamber inside the freeze dry vacuum chamber. Liquid substance is continuously introduced into the freeze chamber and continuously extruded, preferably in annular form, out of the freeze chamber into the vacuum chamber as a frozen substance which seals the vacuum chamber. The frozen substance is severed into cylindrical pieces which are loosely received on prongs for carriage between heating plates for drying. Dried segments are continuously removed from the vacuum chamber.

The following specification and drawings pertain to certain new and useful improvements in the art of freezing and desiccation, and particularly pertain to improvements to that form of dehydration now commonly referred to as "freeze-drying" in which a substance is desiccated or dehydrated while in the frozen state for the purpose of obtaining certain benefits from this frozen condition. In order to improve the freeze-drying art, a novel freezing method and apparatus is disclosed, and this technique proves to have several other uses which will be described.

By way of introduction, some of my investigations, including actual tests which have been made, will first be described.

Figures 1, 2:
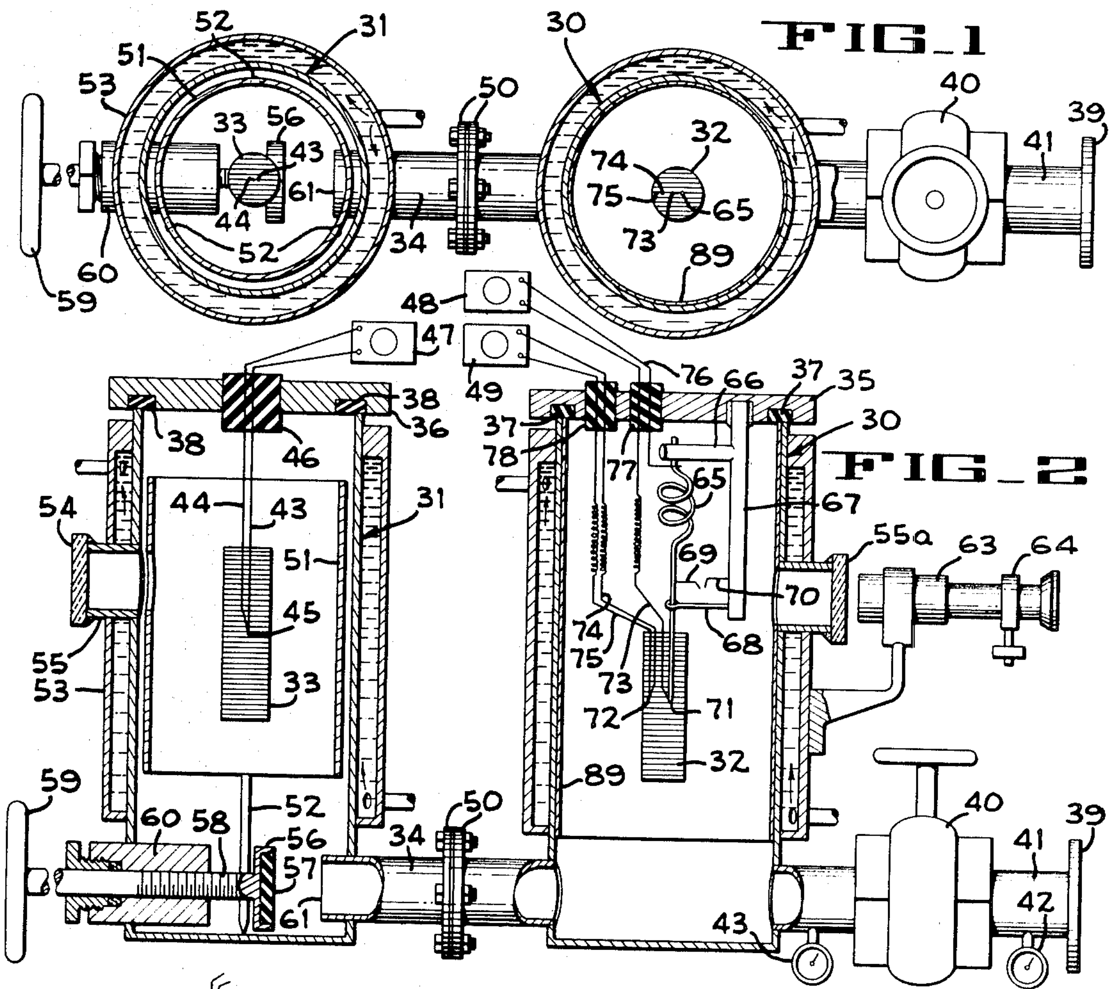
FIG. 1 is a plan view, partly in cross-section, of two connected vacuum chambers.
FIG. 2 is a side view, partly in cross-section, of the chambers of FIG. 1.

FIGS. 1 and 2 illustrate the method by which the drying studies were made which disclosed the behavior of frozen material under vacuum exposure and suggested the means by which the existing teachings in the art could be greatly improved upon. By use of this type of apparatus it was found possible to study the complete drying cycle and to determine the influence upon it of a number of factors, the importance of which had previously not been known or properly emphasized.

The apparatus includes a small vacuum vessel 30 to contain the frozen test object 32 and a somewhat similar vacuum, vessel 31, connected to the first vessel by a relatively large pipe 34. Pipe 34 comprises two sections, one section communicating with the interior of vessel 30 and the other section communicating with the interior of vessel 31. The two sections of pipe 34 each have flanges 50 which are joined. The vessel 31 contains another frozen sample 33, which, for example, may be a piece of pure-water ice.

The vessels 30 and 31 are vacuum tight, supplied with removable cover-plates 35 and 36 which are held in place by clamps, not shown, and provided with rubber gaskets 37 and 38. The interconnected vessels are joined to a suitable vacuum system (not shown) which connects to flange 39, of suction pipe 41. A valve 40 is interposed in the suction pipe 41. Valve 40 has as its main purpose the control of vapor flow from, and hence the control of the degree of the vacuum in, the vessels 30 and 31. The vacuum system attached to the flange 39 is required to maintain at this point a constant high vacuum of a degree better than required in the vessels. Gauge 42 is provided to indicate the vacuum in the pumping system and gauge 43 is provided to indicate the total pressure (the sum of the partial-pressures) in the vessels. The geometry and size of vessels and ducts, especially interconnecting duct 34, are made such that there will be negligible pressure-drop between the vessels and valve 40.

A pair of slender thermocouple wires 43 and 44 is projected axially into vessel 31, with junction 45 more or less centrally located in the vessel. These wires enter through an insulating and sealing plug 46 in the top plate 36. The temperature at junction 45 is indicated by a conventional thermocouple potentiometer 47 containing a reference junction or compensator and being preferably of the recording type. During operation, thermocouple wires 44 and 43 suspend the sample of ice 33, the junction 45 being imbedded near the center of the mass of ice.

Thermocouple wire 43 and 44 can be very slender; number 40 gauge (.003 inch diameter) can be used. When they consist of iron and constantan, they conduct only a negligible amount of heat to the frozen object. Since the ice mass is suspended freely in vacuum in this manner, heat reaches the ice at a rate dependent almost entirely upon conduction, convection, and radiation from the surrounding walls through the intervening dilated vapor. This latter heat-input also can, by suitable arrangement, be held at a very low value, and it therefore has been found that a small cylinder of ice can be suspended in this manner for ten or more hours before having vaporized away enough to uncover the thermojunction.

When a small block of pure water ice, such as the cylinder 33 illustrated in FIGS. 1 and 2, is frozen around the junction 45, the temperature indicated on meter 47 will be very close to the dew point corresponding to the vapor pressure of water in the vessels 30 and 31. The apparatus to the left of flanges 50, therefore, comprises a gauge having the very useful property of reading directly the partial pressure of water vapor, and thus is capable of indicating continuously that vapor pressure to which the object being tested in vessel 30 is being exposed.

Under those conditions where freeze-drying can be carried out profitably, the vapor pressure thus indicated is not appreciably influenced by the presence of the small amount of permanent gas which is usually present. More importantly, I have established experimentally that in the region where freeze-drying is generally conducted, i.e., between 0.1 mm. to 4.0 mm. of mercury head absolute, the vapor pressure from the published vapor pressure curves for ice corresponding to the thermocouple temperature is very close to the true pressure of vapor existing in vessel 31. It should be pointed out, however, that the practical success of this simple vapor pressure meter, and its accuracy, depends greatly upon keeping the heat input to the ice at a low rate, or, by determining this rate and calculating from it a correction factor. For freeze-drying tests, no correction factors are necessary if the heat input is kept as low as can be easily arranged for. This is done by (1) construction vessel 31 of a metal, preferably having a low emissivity, (2) polishing the inside surfaces, (3) preferably providing one or more insulated polished surfaces arranged to screen off heat radiated and conveyed from the walls (4), keeping the walls of vessel 31 as cold as conveniently possible limited only by that temperature where condensation might occur on these surfaces during the experiment. In FIGS. 1 and 2, vessel 31 is therefore made of metal and its walls are polished inside. As an example of a simple thermal screen, the coaxial cylinder 51, made of thin polished metal and supported by three slender lengths 52, is illustrated. Around vessel 31 is shown a jacket 53 containing a cold fluid. For these freeze-drying tests acceptable accuracy can be had by circulating only cold tap-water or ice water and even the cylinder 51 can be omitted, however, when accuracy less than one or two percent is required, or when it is required to sustain operation for a period of twenty-four hours or more, and also when vapor pressures much below 0.1 mm. Hg are to be measured, every expedient toward reducing the heat-input to the ice should be utilized. For the very highest accuracy, theoretical corrections can be reverted to.

It should be pointed out that it is useful to provide a window for inspecting the ice, and also a valve permitting absolute closure of the interconnecting duct 34. Such a valve permits the ice mass 33 to be replenished without appreciably disturbing the vacuum in vessel 30. Thus, in FIG. 2, a glass window 54 is shown cemented to tube 55 which penetrates the jacket 53 and the wall of vessel 31. A valve is shown consisting of the valve-dish 56 having a rubber seat 57, and actuated through valve-stem 58 by hand-wheel 59. The valve-steam penetrates the wall of vessel 31, and is sealed with a suitable packing device such as shown at 60. The valve closes against the protruding end of pipe 34 at 61.

The portion of the apparatus at the left of flanges 50 comprises a complete vapor pressure measuring device of a sort previously not developed for the art. Heretofore, only gauges reading total pressure could be used conveniently. I have proposed the name "chryopiezometer" for this new and useful tool, from the Greek roots for ice and pressure. It should be apparent that this device can be attached to any freeze-dryer and give continuous readings of partial pressures below 4.5 mm. Hg. Other uses also should be apparent.

The dehydration of test samples is conducted in vessel 30 which is fitted with a jacket containing a warm fluid maintained at a controllable temperature. A window 55*a* is provided so that, by means of reading-telescope 63 having a micrometer eye-piece 64, the measurement of very small displacements can be made in the interior of vessel 30.

A small spring balance is contrived of a few turns of stiff constantan wire 65, supported by an arm of quartz rod 66 fixed to a quartz post 67 which is cemented to the cover plate as shown. The lower end of the spring is guided by a wire loop 68 and supplied with a moving pointer made of fine wire 69. The movement of pointer 69 relative to stationary pointer 70 fixed in the post 67 can be observed and read in convenient length-units by means of the telescope and micrometer eye-piece.

The lower end of the constantan wire continues axially downward and at its lower end is joined to a very fine iron wire 73 to make a thermojunction 71 at this point. The fine iron wire 73 is coiled into a very flexible spring having little influence upon the deflection of the heavy constantan spring 65, which deflection is calibrated in weight-units before use. Iron wire 73, as well as a fine constantan wire 76 which is soldered to the upper end of spring wire 65, are lead out of the vacuum space through insulating plug 77 and are attached to temperature reading device 48. Temperature reading devices 48 and 49 are similar to device 47 described above.

Thus, when a test object is frozen so that thermojunction 71 is embedded in it, the temperature at the junction as well as the weight of the test object can be continuously determined and recorded throughout the whole drying cycle. Generally, thermocouple 71 is embedded axially at the center of the frozen test object, which is conveniently a small cylinder about ⅜ inch in diameter and 1½ inches long. Provision is made so that another thermojunction 72 also can be embedded just within the exterior surface of the test object. The wires 74 and 75 forming this later junction are each coiled for flexibility and lead out of the vacuum through insulating plug 78 to temperature-reading device 49. By this means the temperatures near the exterior surface can be determined and compared with the temperature at the center. Junction 72 is sometimes dispensed with, and for clarity, is not shown in FIG. 3.

Figures 3, 4, 5, 6:
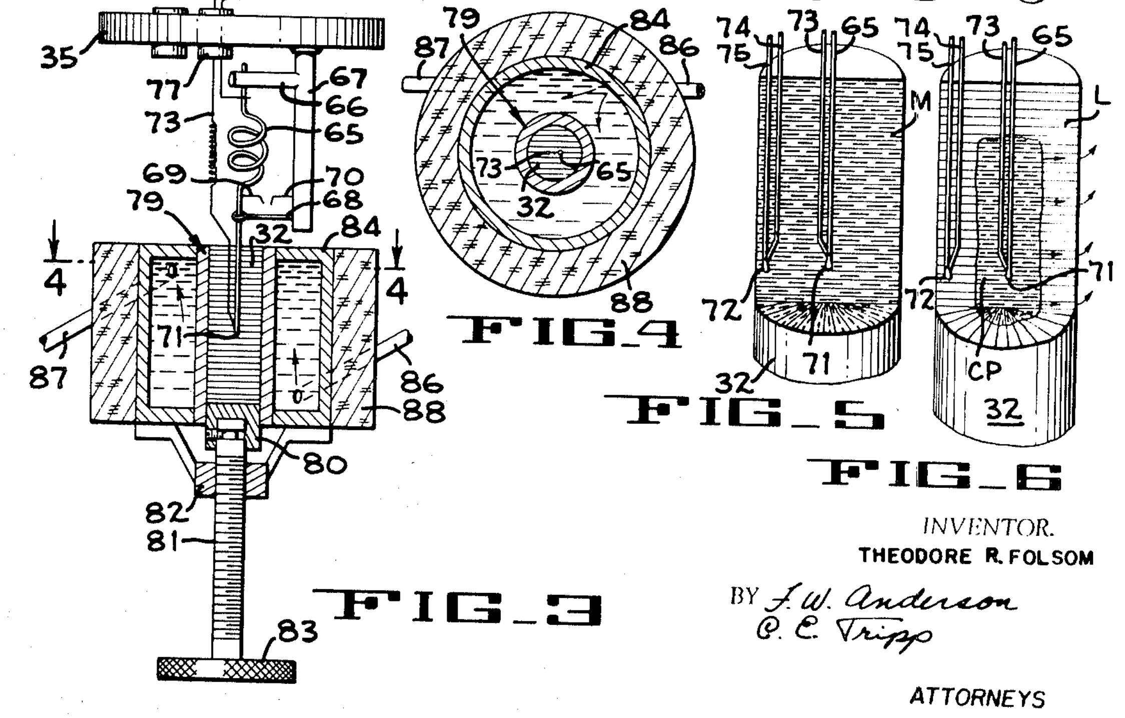
FIG. 3 is a side view, partly in cross-section, of a device for preparing frozen samples for the investigation of freeze drying.
FIG. 4 is a view taken on the line 4—4 of FIG. 3.
FIGS. 5 and 6 are enlarged break-away views of frozen test samples, the sample of FIG. 5 showing the appearance of frozen but undried material and the sample of FIG. 6 showing the appearance of the material after considerable loss of water vapor has occurred.

FIG. 3 illustrates a convenient device for preparing frozen samples for the freeze drying investigation to be described. FIG. 3 is an axial section and FIG. 4 is a section normal to the axis.

The freezing device consists of a small cylindrical tank 79, open at the top, and fitted with a piston 80 actuated by screw 81 passing through nut 82 and turned by knob 83. A jacket 84 surrounds cylinder 79 and is preferably insulated thermally by a cork jacket 88. Inside jacket 84 a fluid can be circulated, entering pipe 86 and leaving pipe 87.

FIG. 3 shows how the cover plate 35 of the test chamber 30 is suspended over the freezing tank 79 during the freezing step. Tank 79 is filled with the liquid to be frozen and the thermocouple 71 is immersed to the desired position and held there until the liquid is frozen solid. A cold fluid is sent through jacket 84 to cause the freezing.

When the liquid is sufficiently frozen, the frozen material may be ejected by the pressure of the screw. Although frozen test samples having the most desirable surface conditions can be made by mechanically extruding them in this manner, for reasons which will appear below, it has been found that wherever the nature of the substance being tested permits a less desirable treatment, it is more convenient to very quickly raise the temperature of the fluid in jacket 84, after the material has become hard frozen, so as to cause a slight softening at the outer surface of the frozen material. The instant after softening occurs at its outer surface, the frozen cylinder can be forced or lifted out with ease. This expedient of partially thawing the surface of the frozen material was resorted to only because of the delicateness of the little spring-balance and the danger of distorting it if mechanical force alone was used. Observations from these tests indicate that surface thawing should be avoided when the optimum conditions for freeze-drying are desired. In the case of many of the substances being tested, satisfactory freeze-drying could be attained and data accumulated. However, in many cases, it was apparent that this thawing at the surface detrimentally changes the crystal structure at the surface and can result in the formation of a syrupy film upon exposure of the surface to vacuum. Such a film acts to prevent the rapid escape of vapor and can cause complete failure. Fortunately, because of the excellent vacuum exposure permitted with the apparatus of FIG. 2, many substances could be tested in spite of this problem, and even the problem itself could be studied to advantage. The data at the very early part of the drying-cycle had to be discounted because of this condition, however.

These observations upon the effect of freezing technique lead to the development of the preferable freezing method to be described. It became clear that (1) freezing should be done by withdrawing substantially all of the heat through those surfaces which are to later release the vapor, and (2) avoiding destruction (such as by thawing) of the desirable surface properties thus produced.

In the performance of drying tests, a cylinder of pure water was frozen around thermocouple 45, at the same time a sample of the material to be treated was frozen around couple 71. The two cover plates were then replaced on the vacuum vessels and the vacuum valve 40 opened to establish the desired vacuum.

The initial and subsequent weights of the test sample 32 were then taken as well as repeated readings of the thermocouple temperatures.

Figure 7:
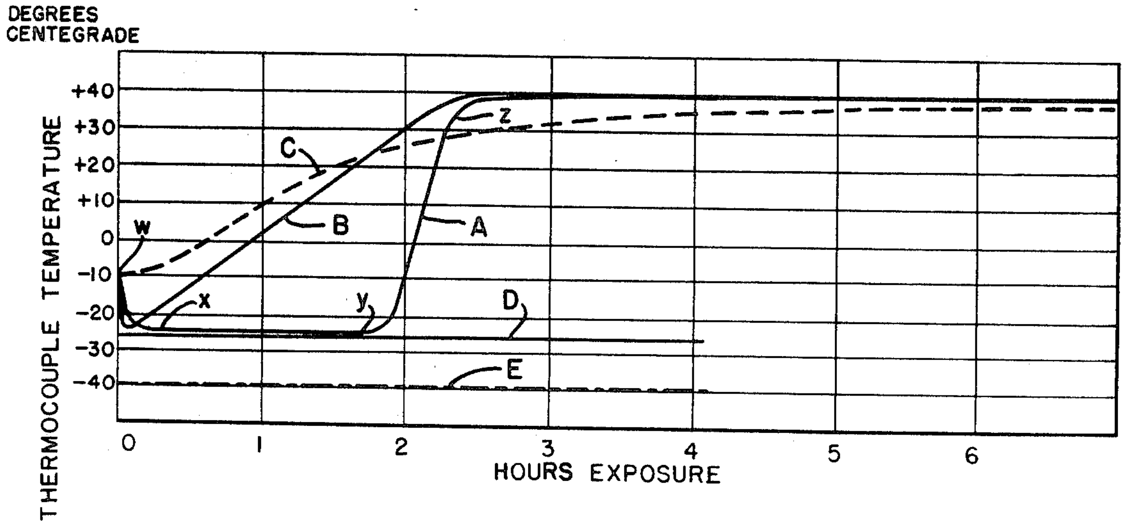
FIGS. 7 and 8 are graphs showing data of drying tests.
Figure 8:
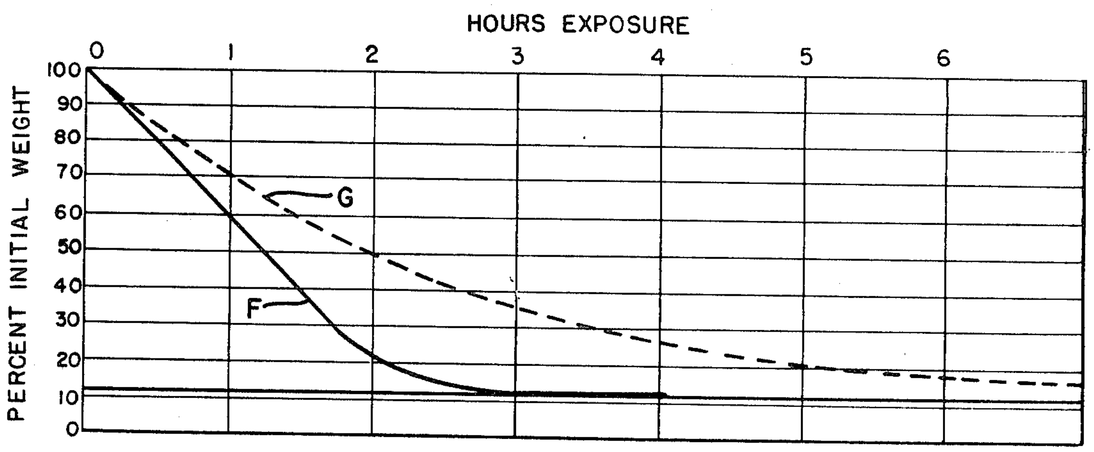

These data were plotted as shown in FIGS. 7 and 8, the weights being plotted in terms of percent of initial weight.

The above described drying tests disclosed with unusual completeness what actually happens when a frozen substance is exposed to vacuum. A number of phenomena were clearly evident so that their importance could, for the first time, be properly emphasized. With the information obtained, it was possible to propose several improvements in the practical arts of freezing and of drying.

A very encouraging observation was that complete dehydration could, under certain circumstances, be obtained exceedingly rapidly in comparison with what is customary in drying frozen masses of similar dimensions and of similar constitution. For example, the conventional tray-drying of difficult products often requires ten to thirty hours, whereas curve F of FIG. 8 illustrates how the moisture can be reduced to a very low level in three hours or less, and extreme dryness can be be reached in only a little more time. It was evident that better drying rates could be attained.

Another important observation was that many substances which have been heretofore found difficult or impossible to freeze-dry can be very satisfactorily dried by the new technique. For example, curve F in FIG. 8 represents a typical example of how pure orange juice dries by this method, providing certain requirements to be mentioned later are met.

It was also discovered that it was possible to use a very rough vacuum without retarding drying and without detrimental effect upon the product. Thus, by proper emphasis on the manner of heating, freezing and exposing the substance, the expense of disposing of vapor could be minimized.

It became apparent that by utilizing the information gained in these tests a very efficient large scale process could be evolved, since savings could be made in equipment costs and in operating costs. Continuous conveyance through a heating region within the vacuum chamber and subsequent removal without spoiling the vacuum, as taught by my patent. U.S. 2,411,152 can be practiced effectively with the new freezing and exposure techniques.

Curves A and B in FIG. 7 (in which thermocouple temperature is plotted against time of exposure) and curve F in FIG. 8, show the behavior of a product such as orange juice when being freeze-dried in the apparatus of FIG. 2. In this particular example, the walls of vessel 30 are kept at +40 degrees C., and the vapor pressure, as read by the cryopiezometer, is kept at about 0.4 mm. Hg which later datum corresponds to the vapor pressure in equilibrium of pure ice at about −26 degrees C. The horizontal line D at the −26 degrees C. ordinate is the reading of the cryopiezometer.

Curve A gives the temperature at the center of the test sample where thermocouple 71 is situated. Curve B gives the temperature near the external surface at thermocouple 72. Curve F gives the weight of the sample at any time during the drying cycle, in terms of percent of the initial weight.

Curve A represents the typical behavior of the temperature at the center of the frozen object being dried under good conditions of exposure to vacuum and heat. The maximum benefit from the utilization of the frozen state is being obtained under these conditions. Just how well these ideals are being approached may, therefore, be ascertained by an inspection of the general shape of the central-temperature vs. time curve (curve A). The ideal curve is characterized by a flat, almost horizontal portion, as shown between points $x$ and $y$ on curve A, followed by a more or less abrupt upswing. The upswing is followed by a rapid rise toward the temperature of the heat source, and this is followed by a more or less abrupt bend at point $z$. Thereafter, asymptotic but rapid approach to the temperature of the heat source follows.

In order to emphasize the character of this curve by contrast, curve C has been added and displays the general behavior of the central temperature of a substance being dried in the non-frozen or improperly frozen state. The exact shape of this latter curve depends a great deal upon the constitution of the substance, since this determines the rapidity by which water can be diffused from its interior. The general character of the curve comprises an early gentle upswing, followed immediately by a slow reversal of curvature and very gradual approach to the temperature of the heat source.

It should be emphasized that the same identical substance can be made to follow the behavior typified by either curve A or curve C and often in freeze-drying the temperature may start out by following a curve like A and later deviate into a curve like C indicating a failure in the maintenance of the ideal freeze-drying conditions required to produce the A type curve.

A major benefit arising from drying under ideal freeze-drying conditions is the very rapid attainment of a low moisture content while avoiding elevated temperature, and therefore it is of importance to notice on curve F that the rapid loss of weight continues even until a very low moisture content is attained. In contrast, improperly frozen or improperly exposed test objects, such as that represented in curve C, prove to release their final moisture so slowly that only a long exposure at elevated temperature can be resorted to. Curve G has been inserted in FIG. 8 to indicate the general character of the weight-loss curve under the adverse drying condition which gives rise to the temperature curve C. The curves C and G represent what frequently happens when the processing of a difficult substance such as pure orange juice is attempted with a poor technique; for example, when a sample of frozen orange juice is permitted to accumulate a frothing syrup film so as to seriously limit escape of vapor from the surface.

Because of inadequate teaching, it has been the common practice in the art to reduce the heat input to a ridiculously low value and sometimes also to increase the vacuum to an expensive level whenever a difficult product tends to behave in the manner illustrated by curves C and G. Reducing the heat input results in the long and unprofitable drying times which are now customary, but which will be shown herein to be unnecessary. It will be shown possible to supply heat rapidly if proper freezing and exposure are arranged for, and that no extremes of vacuum are generally necessary.

In order to make clear how full advantage may be taken of the properties of the frozen state so as to improve the freeze drying process, some of the phenomena prevailing will be briefly described. The reasons for the shape of curve A in FIG. 7 can readily be understood when an inspection is made of what goes on in a piece of frozen material suspended in vacuum and exposed to heat as shown in FIG. 2.

FIGS. 5 and 6 are enlarged break-away views of the frozen test object 32. They represent the appearance of the sample when sectioned axially so as to disclose the thermocouples. FIG. 5 represents the appearance of the frozen but undried material at the outset, corresponding to the initial point *w* on curve A. FIG. 6 represents the appearance after considerable loss of water vapor has occurred, corresponding to a point on curve A lying between points *x* and *y*.

Under a low-powered microscope the cut surface of the frozen material such as shown at M discloses that the frozen object consists of closely-packed ice crystals, generally needle shaped, separated from one another by, and embedded in, a matrix of other materials.

In the case of foods and many other materials commonly freeze-dried, the matrix material is general amorphous in nature and contains a considerable portion of "bound," unfrozen water regardless of how low the temperature may be. This matrix material frequently is a thermoplastic or a substance whose viscosity, rigidity, or plasticity changes appreciably with the temperature, and also sometimes with only slight variations in concentration of constituents. Chemically it often is very complex, but sometimes, as in the case of fruit juices, may consist mainly of a very concentrated sugar solution to which is added small amounts of flavoring materials, oils, acids, cellulose fragments, and colloidal materials. The matrix material of orange juice, for example, is scarcely more than a liquid at temperature near 0 degrees C.

A visual inspection of a similar section through a partly dried cylinder, such as that illustrated in FIG. 6, will show that the ice crystals have disappeared from the outer layers L and remain only in the central portion CP. Only a skeleton, consisting of the original matrix minus some of its original "bound" water, remains. Obviously the ice has vaporized and the vapor escaped through the pores of the matrix.

Under ideal conditions the matrix offers little interference to the flow of vapor, and therefore the ice readily vaporizes at the receding boundary of the central region CP, keeping this boundary surface cooled practically to the level which a fully-exposed surface of pure water ice would attain in the same vacuum. In other words, when there is a relative pressure-drop through the matrix skeleton, the temperature indicated by thermocouple 71 is only a little higher than that indicated by thermocouple 45. And for this reason curve A parallels curve D and remains only slightly above it for a long period in the case of ideal freeze-drying. The curve A is therefore a handy index of this desirable behavior.

Obviously, cases not perfectly ideal will be met, where there is some pressure drop through the matrix. This will be evidenced by a slight rise in curve A between points *x* and *y*, which indicates that the pressure drop increased as the vapor path becomes longer. This rise is partially a function of the matrix porosity and this, in turn, is only partially controllable since it depends partially upon the original constitution of the substance. However, with a given initial substance, the pressure drop should be kept as low as possible if maximum efficiency and the best possible product is expected. This is partially because, when following a curve of type A, the substance is maintaining itself at the lowest possible temperature by virtue of an easy escape of vapor, and this permits the safe application of heat at the highest rate.

A cardinal rule in freeze drying therefore is to create the most permeable or porous matrix and maintain it as long as possible. Many benefits can come from following this rule; one of the most important arises from the fact that, if the matrix is a readily permeable mass having thin-walled structure and extensive internal area at the end of the cycle, then the final moisture, which inevitably must come out of the matrix itself, can rapidly escape at moderate temperature and moderate vacuum.

Prevalent practice frequently leads to damage of the matrix skeleton or fails to provide means for the production of an adequate one. The matrix almost always contains much water, and though sometimes as in the case of a protein it inherently possesses rigidity, it frequently, as in the case of orange juice, has a plastic nature and only a little, if any, jellylike "set." The heating technique to be described is a most effective method of preventing collapse of matrices of the more difficult substances. The freezing technique to be proposed provides a crystal structure suitable to combat this problem.

It is often found possible to add a small amount of certain materials to a substance before processing which effectively prevent matrix collapse. Electrolytes should be avoided because of depression of freezing points caused; colloidal material, such as albumins, in amounts of 10% on a dry solids basis are very effective when permitted. The most effective additive for fruit juices and similar substances is a smooth suspension containing particles of size ranging from the true colloidal up to the palpable or even coarser. The purpose and effect is similar to that of "adding straw to brick," the minute cell walls of the matrix being reinforced by not only a true or semi-colloidal "set" but also by mechanical reinforcements due to the larger bodies such as small fibres. Since cell walls of the matrix can be of the order of ten thousandths of a millimeter thick, the size of particles need not be appreciable to give mechanical strength, and need not be visible as individual particles. Such a particle size range is what normally occurs when many solid foods are reduced in a so-called "colloid mill" just to a smooth impalpable cream. Particles of .0001 mm. to .001 mm. are effective and larger particles are also effective whenever their poor suspendability can be tolerated in the rehydrated product.

As an example of this novel mechanical matrix support-method, to 10–20 parts pure orange juice is added one part by wet weight of orange rind, or preferably the outer yellow portion only of the rind for the sake of flavor and other benefits. The rind solids are reduced to a smooth cream in a comminutor together with the juice, or alone. This mixture drys much faster than pure juice and stands much abuse because of reinforcement of the matrix structure. Other benefits are apparent also.

This method of freeze-drying avoids the use of excessively high vacuum because pores in the matrix are kept open and vapor can escape readily so that excessive pressure drop in the matrix is avoided even though vaporization is rapid. It is futile to attempt to control the temperature of the product by resort to excessively low pressures unless the heat input is seriously restricted. A pressure drop always occurs in the matrix and can best be controlled by controlling the size of the pores. Below a certain pressure, further reductions have no effect whatsoever upon the internal pressure in the matrix, and hence no effect upon the temperature of the vaporizing ice, because the pores can at very low pressures behave as limiting orifices in which the upstream pressure and amount of flow is not influenced by further reductions in the downstream flow. A larger pore size would be the only way of increasing flow, with a given ice temperature, under these "critical flow" conditions.

This effect has been repeatedly demonstrated by me and by tests similar to those illustrated in FIG. 7. While holding heat input constant, one reduces the pressure in vessel 30: below a certain critical pressure, the temperature of the produce (indicated by thermocouple 71) refuses to respond. This level depends upon the porousness of the drying product and can't be specified. FIG. 7 gives an actual example. If the vapor pressure were to be held so that pure ice was at the temperature, not of —26 degrees C. (as shown by curve D) but rather of —40 degrees C. (as shown by curve F), then curve A would change remarkably little. Further reductions to extremely low pressures would not affect curve A.

It is not possible to specify the minimum degree of vacuum required for any product without knowing its character and concentration. The vapor pressure at the ice crystals which are vaporizing determines their temperature, and this determines the temperature of the neighboring matrix material. This temperature must be maintained low enough to keep the thermoplastic materials rigid enough to prevent immediate or premature collapse. On some substance, such as plasma or milk, this temperature seems to be near zero degree C. so that pressures of 2 or 3 millimteters on the vacuum might suffice. On other substances, such as pure orange juice, some fluidity of matrix is evidenced even at —20 degrees C. and therefore pressures of 0.2 to 0.4 mm. are generally required in practice.

The pressure drop between the vacuum space and the crystals is controlled by pore size more than anything else; the instant process provides favorable pore size and therefore more favorable vacuum requirements and/or rate of vaporization.

In accordance with the above, a new drying method is disclosed herein which comprises:

(A) An improved exposure technique. In brief:

(1) Material is effectively exposed over an extended area while space is conserved in the expensive vacuum chamber, and continuous operation is permitted.

(2) Frozen masses having thin sections are exposed so as to: increase tolerance to rapid heat input, reduce drying time, and permit a rougher vacuum.

(3) The material is suspended openly in vacuum so as to provide for: rapid escape of vapor, rapid input of heat in a beneficial manner, and so as to sustain porosity and provide for ideal drying.

(B) An improved heating technique. In brief:

(1) Heat is introduced almost entirely through the vacuum, so as to provide for exposure requirements as well as permit the maintenance of porosity.

(2) Heat is supplied from heating surfaces of proper design so as to permit convenience, economy, and proper control.

(3) Heat input is controlled according to the dissipating-ability of the product throughout the cycle.

(C) Preparation and freezing of the material is carried out so as to provide conditions at the surface and interior most favorable for drying. To this end, a novel freezing method is introduced for meeting the foregoing requirements and or other benefits.

The new drying method comprises the suitable preparation of frozen bodies having extended area and thin section, exposing these bodies to heat coming almost entirely through the surrounding vapor while suspending the bodies so that little heat is conducted to them through the supporting members and so that most of the external area can receive heat and give off vapor rapidly.

The benefits coming from an extended transfer area in any heat transfer problem are obvious. Extended area contributes to the rapid vaporization which proves to be the factor which limits heat input and controls the productive capacity of any freeze-drying apparatus. Novel means are proposed herein for obtaining an extension of area of products so that space in the expensive vacuum chamber can be saved, while at the same time meeting the other requirements for rapid dehydration and while providing means for continuous operation.

The distance through which heat must penetrate and through which vapor must escape strongly influences the rate at which heat can be introduced and somewhat influences the degree of vacuum which must be maintained. Thinness alone is not the only, or the most important, criterion for rapid drying, as will become apparent, but its convenient attainment is desirable.

The method and apparatus being here proposed is mainly concerned with the processing of masses of a thickness between about ⅛ of an inch to about ½ of an inch. Much of the new technique is capable of extension to thinner or thicker masses, but this region of thickness is chosen for discussion because a reasonable drying time, say from 1 hour to 8 hours, can be readily attained by convenient practice and with a wide variety of substance.

Since it is desired to introduce heat so that it penetrates the matrix skeleton to reach the ice crystals, there will be a temperature drop in this region, and the rate at which heat can be supplied without overheating the outer layers of the matrix depends partially upon the distance of penetration. It has been discovered that excessive surface temperatures can be avoided on objects of a reasonable thickness, say ¼ of an inch., when proper exposure is provided and the porosity is maintained, even when heat is supplied very rapidly. For example, slabs of frozen fruit juices about ¼ of an ich thick can be safely exposed to heat from plates parallel to the heating surface and about ½ inch distant even though these plates are at a temperature of 350 degrees F. or more during the early part of the drying cycle. It will be shown later that an early rise in temperature of the matrix is desirable.

With very thick slabs, and especially when adverse conditions for the existence of a porous matrix prevail, there can be some frictional pressure drop in the vapor escaping from within. Thinness of section therefore diminishes the vacuum requirements, but it should be emphasized that the maintenance of a good matrix porosity has a more important influence on the vacuum requirements.

The open suspension of the material to be dried on such supporting members such as, for example, thin wires rather than upon trays or shelves or container walls is recommended because the former provides for proper heating and exposure whereas the latter causes serious limtation to heat input and vapor escape. Although ice is a better thermal conductor than is dilated vapor, introduction of the major portion of the heat by means of extensive contact with an ice body with a heat-supplying surface is erratic and the possible heat input is limited directly and indirectly by this primitive technique.

This open exposure can be accomplished by supporting the frozen material on members which are prevented from conducting appreciable heat to the body, and which are designed so as to avoid interfering with the arrival of heat from the distant heat source and so as to avoid interfering with escape of vapor, especially from those surfaces of the body receiving heat.

For example, chosen because of ease of explanation of what can be considered favorable exposure, a frozen slab (say ¼ inch thick) can be pictured suspended centrally between two parallel heating plates spaced say 2 inches apart. Favorable suspension might be obtained by means of a few slender wires embedded in the slab or upon which the slab rests. The slab might also be made to rest upon a very open-meshed screen of slender wires, say ¼ inch mesh of slender wires $\frac{1}{32}$ inch or less in diameter. It is apparent that, when the supporting member is embedded or inserted into the body so as not to be interposed between the heat source and the external surfaces of the body, a larger area of contact can be permitted. For example, wires, blades, or tubes penetrating from the edge of the above described frozen-sheet could be permitted, but these members must be insulated, or themselves be insulating, so as not to conduct substantial heat into the body.

The method of suspension and exposure shown in FIG. 2 is exceptionally good, and other examples especially suited for large scale continuous operation will be given below.

Heating from distant surfaces permits the best exposure, permits introduction of heat as rapidly as it can be dissipated, and causes drying to proceed in such a manner that porosity is maintained and complete dryness is attained rapidly. A greater amount of heat can be transferred properly per unit volume of vacuum chamber than is possible in any other way.

Heat is made to enter the material being dried through those surfaces giving off vapor and to penetrate the matrix skeleton before reaching the ice crystals. This permits the matrix material to dehydrate appreciably immediately after its being uncovered, and in consequence of this early dehydration becomes stiffened mechanically so as not to collapse but to retain its porosity.

The "bound" water in the matrix material is, at the time of freezing, in equilibrium with the ice phase. This bound water can be released rapidly only when the temperature is raised above that which should be maintained in the ice crystals. A progressive increase in temperature as dehydration and concentration of matrix solids proceeds is required to promote rapid dehydration and stiffening of the matrix. The instant heating method, better than any other, provides for early drying of the matrix and maintains porosity better. As a result, more rapid and complete drying is accomplished and the product is subjected to lower temperatures, especially at the end of the cycle when final moisture is removed. Products never before successfully freeze-dried can be processed in this manner.

In contrast to this beneficial method of introduction of heat, the usual practice is to introduce the heat mainly or substantially through the ice mass to the vaporizing ice surfaces. The matrix therefore cannot rise in temperature substantially until the ice is all gone, and being frequently of a plastic nature in the undried condition, frequently collapses before the ice can be removed. Collapse prevents escape of vapor and requires reduction of heat input to ridiculously low levels. This problem seldom can be combated by merely increasing the degree of vacuum. It is fortunate indeed for the early growth of the art that early workers found some substances such as proteins like blood plasma which possessed coherent rigidity of matrix and would tolerate the promotive technique used.

Curve B in FIG. 7 shows how the temperature near the surface at thermocouple 72 rises before the ice is gone. Point *y* on curve A discloses the time when the ice has receded to the axis. That there still is substantial moisture at this time and that this is capable of rapid removal is indicated by curve F.

Heat can readily be obtained from distant surfaces at moderate temperature if the surfaces have extensive area so as to subtend a large solid angle at the body, and if the surfaces are good "black body" radiators. Since it frequently happens that as much as half of the heat is transferred through the vacuum by means other than radiation, the heating surfaces should be placed as close to the frozen material consistent with requirements for vapor escape and uniformity of heating.

Heating surfaces should be made of (or coated with) a suitable material, for example, glass, ceramic, or organic material, so as to have high radiation emitting ability. In FIGS. 1 and 2, such a coating is indicated at 89, in the form of a lacquer.

Heating surfaces can be improved by use of fins, corrugations, or roughness. Fins or corrugations seldom need to be placed more than ½ inch to 1 inch from the frozen surface. When more or less parallel plates are used, such as shown in FIGS. 15, 16, 19 and 20 extensions in one dimension should be limited, or suitable ports provided so that vapor egress is provided.

The greatest economy of vacuum chamber can be provided by requiring each heating element, or plate, to emit heat more or less equally from two sides. This may be done by alternating or sandwiching the heating element with the frozen objects, as illustrated in FIGS. 15 to 20. This is distinctly different from present practice, since the major portion of the vacuum chambers by this method is filled by either heating plate, at optimum heating temperature, or with product. There is no tray or other extended supporting member which must be maintained at relatively low temperature and contributes heat only ineffectively for reasons outlined above. The product receives heat from more than one extended face, or is substantially surrounded by heated surfaces at a distance and at moderately high temperatures, that is, at temperatures substantially above freezing point such as 95–300 degrees F. for example.

More or less parallel-arranged heating surfaces, preferably extensive only in one direction, such as illustrated in FIGS. 16 to 20 are especially suitable for continuous operation since conveyance between them is thus convenient and other provisions are met.

Heat import should be controlled so that the maximum over-all rate of processing can be obtained, consistent with obtaining the desired product. Proper control should emphasize the requirements for removal of final moisture at a satisfactory rate, and should avoid local overheating.

Local overheating is avoided by proper choice of shape and size of the body treated and disposition of heating surfaces so that temperature rise is uniform insofar as possible. For example, at the edges of an extended sheet of material, drying will be more rapid than at points away from the edge, unless the heat input rate is made less at the edges, for example, by exposing the edges to less heating surface area or to heating surfaces more distant or at a lower temperature. Making the edges more thick than at the center also provides for more uniform drying. Rotating the body during drying so that uniform or properly distributed heat to cause uniform drying can be practiced. For example, on the apparatus of FIG. 19, the frozen tubular objects may be caused to rotate upon their own axes while being conveyed. Apparatus suitable for providing this extra motion should be apparent and will not be discussed.

Curves A and B of FIG. 7, as well as other evidence, indicates that heat input should be varied during the drying cycle in response to changes in heat dissipating ability. Maximum heat can be applied shortly after first exposure to vacuum. Heat input may be held constant or nearly so until ice has all disappeared and then should be reduced, preferably progressively, so as to prevent any part of the body becoming overheated. Control of the heat input can be done by controlling the temperature of the heating surfaces, or by moving the drying body from one heating region to a different one. The later method is very effective for continuous operation. The body is moved from a region giving rapid heat input to one where heat input is lower by means of the carrier causing progress of the material through the chamber.

In any event the temperature at the time final moisture is removed should be only a few degrees, say 10–30 degrees F. above the temperature tolerated by the substance. For such substances as foods, the tolerance temperature for a short period, say 30 minutes, can be taken roughly as slightly above (say 10 to 30 degrees F.) the temperature used for final storage.

On curve A, point *y* indicates the point corresponding to which substantial heat input reduction should be commenced. At point *z*, the temperature of the heating plates should be only a few degrees above the safe tolerance temperature. For ideal operations the final temperature of the heating plates should be essentially that of the tolerances temperature. It should be noted that FIG. 7 illustrates a particular experiment where a constant temperature of 40 degrees C. is maintained at the heating surfaces. With variable heat input, the corresponding curves have the same general character, however. For example, the main effect of using a much higher heating temperature during the early stages would be the compressing of the curve A to the left, i.e., shortening the time.

A properly prepared and exposed frozen body can stand amazingly rapid heating in the manner described. Drying times of two or three hours with difficult products are the result. For example, in an apparatus similar to that shown in FIG. 19, having heating plate spacing of two inches, having the product in frozen tubes with ⅝ I.D. and 1" O.D., having vacuum maintained at about 0.3 to 0.4 mm. pressure, many difficult products such as fruit juices and fruit pulp can be dried in from 2 to 4 hours. The temperature of the plates can be maintained at up to 300 degrees F. or more for the first ¾ of the drying time without in any way damaging the porous structure or causing thawing. Thus, the early drying is done rapidly without causing damage which would make final drying at moderate temperature a slow process. Foods are generally dried in this apparatus by using water at about 100–150 degrees F. and/or live steam at 0–100 pounds per inch in the heating jackets. Of course, electric or other heat sources could be used.

Freezing must be done in such a way that proper exposure and heating can be carried out economically. A number of methods of freezing might be applied to the drying technique above, but the extrusion method to be described has proved especially suitable.

The extrusion method provides a means for introducing the material immediately to vacuum in a suitable geometric form, without thawing at the surface at any time, and continuously, and with ideal crystalline conditions at the frozen surface.

Since essentially all of the surfaces which are brought to exposure are the same surfaces which, by this method, have been used to extract heat during freezing, and since freezing results in the growth of needle-shaped ice crystals normal to the freezing surfaces, ice crystals are arranged normal to the exposure surface. Therefore, as drying proceeds, tubular passages normal to the outer surface are formed by the vaporization of the needles and permit most easy escape of vapor from the interior. The method is uniquely characterized by the beneficial aspect that most all of the exposed surface has been prevісusly a freezing surface.

When a long smooth cylinder or tube having a uniform and smooth bore is filled with a pure substance (such as water) capable of freezing into a single solid phase of one kind of crystals (such as ordinary ice), it will be found that when the tube and liquid has been cooled even silghtly below the freezing point and has become frozen solid, the plug so formed can be forced axially out of this cylinder only by the exertion of extremely high pressures. However, I have found that under certain conditions, when this same procedure is repeated with a complex substance such as orange juice, a piston or extrusion of solid frozen material can be forced out with comparative ease.

Material frozen in a uniform cylinder can, of course, be forced out of the cylinder by pressure upon the material by a mechanical piston, but a more satisfactory method for the purpose at hand is to cause the liquid material which is to be frozen to be introduced into one end of a cold cylinder under such a pressure that frozen material will be forced out of the distal end by the hydraulic action of the incoming liquid. Of course, frozen extrusions can be likewise made from semi-solids and plastic materials as well as highly fluid liquids. However, the unfrozen material will hereafter be frequently referred to as a "liquid."

Figures 9, 10, 11, 12, 13, 14:
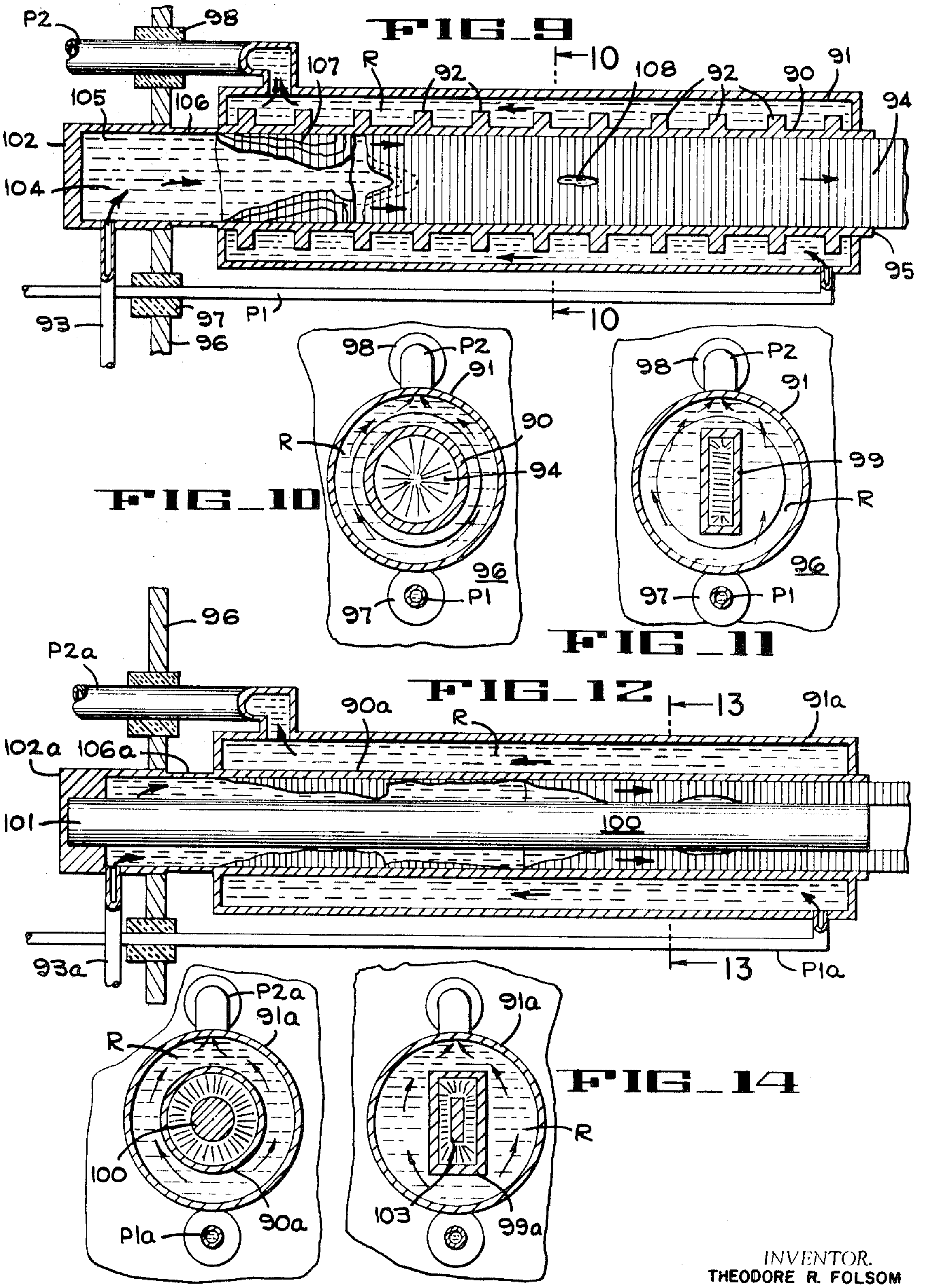
FIG. 9 is a side view, partly in cross-section, of a device for the production of frozen extrusions in the form of a continuous solid rod having a circular cross-section.
FIG. 10 is a view taken on the line 10—10 of FIG. 9.
FIG. 11 is a view similar to FIG. 10 but a rectangular tube to produce rectangular extrusions.
FIG. 12 shows a device similar to the device of FIG. 9 except that it is constructed for the production of hollow extrusions.
FIG. 13 is a view taken on the line 13—13 of FIG. 12 showing a core rod to produce a tubular extrusion having a circular cross-section.
FIG. 14 is a view similar to the view of FIG. 13 except showing a core rod to form extrusions having a hollow rectangular cross-section.

FIGS. 9 and 10 illustrate a simple form of a practical device for the production of frozen extrusions in the form of a continuous solid rod having circular cross-section. A cylinder 90 with a smooth bore and closed end 102 is surrounded for part of its length with a jacket 91 containing a refrigerant R, to define a heat exchanger. In this instance circular fins 92 are provided as shown to enhance the heat transfer from the cylinder 90 into the refrigerant. The refrigerant is illustrated here as being circulated as in the conventional "flood system" method where some such refrigerant as ammonia is used. It must be realized, however, that a cold brine or other secondary cooling fluid could be used in the jacket for the same purpose. The refrigerant is shown entering through pipe P1 and leaving through pipe P2. There is no contact between refrigerant R and the substance being frozen.

The liquid to be frozen is introduced into the freeze chamber defined by the bore of cylinder 90 through pipe 93 under such a pressure as to force the solid frozen material 94 out the distal end 95.

The freezing cylinder jacket and pipes may be insulated by any convenient means. However, FIG. 9 illustrates a novel insulating technique especially convenient and suitable for use in connection with vacuum systems. The wall of the vacuum chamber is represented by 96, shown in section and bounding the atmosphere on its left side and the vacuum on its right side. Pipes P1 and P2 penetrate the wall 96 through seating and insulating plugs 97 and 98 respectively. Therefore, all members to the right of wall 96 and plugs 97 and 98 are surrounded by vacuum and are thus effectively insulated from thermal losses. Polishing the outer surfaces of the jacket, cylinder, and pipes improves this insulation.

Since the freezing cylinder penetrates the vacuum chamber 96, and since the frozen plug seals off the fluid material, a means is thus provided for introducing the material to be treated into the vacuum chamber without interrupting or spoiling the vacuum.

Freezing cylinders can be constructed to produce frozen extrusions having almost any cross-section. FIG. 11 illustrates how a smooth rectangular tube 99 can be used in place of tube 90 to produce rectangular extrusions. By suitable choice of dimensions of the rectangular freezing tube, continuous sheets can be produced having thin section and extensive area. Surprisingly little difficulty will be experienced in producing extrusions having sharp corners, although sharp corners should be avoided if maximum freezing capacity and uniform temperature is desired in the extrusion. Also, sharp corners tend to freeze dry prematurely.

FIGS. 12, 13 and 14 illustrate how hollow extrusions can be produced by the addition of a suitable core. Cylinder **90*a* has a jacket 91*a* to receive refrigerant R, which is introduced through pipe P1*a* and discharged through P2*a*. A coaxial core in the form of rod 100 is shown supported at end 101 by rigid attachment to the closed end 102*a* of cylinder 90*a*. In FIGS. 12 and 13, a coaxial core rod with circular section is illustrated for producing a tubular extrusion having circular section. FIG. 14 illustrates how extrusions having hollow rectangular cross-section can be formed by the use of a rectangular core-rod 103 within a rectangular freezing cylinder 99*a***.

The cores used, of course, do not necessarily have to be coaxially mounted, and almost any combination of core shape and cylinder shape can be combined. Frozen extrusions with cross-section in the shape of a horse-shoe have been successfully produced by an obvious core and cylinder arrangement, in this case the core being displaced into contact with the cylinder.

For maximum freezing capacity and rapidity of freeze, it is desirable to provide for cooling the cores by refrigerant as well as the cylinder. This can be done by providing passages for circulation of refrigerant within the core, but these passages are not illustrated in FIGS. 12, 13 and 14 for the sake of clarity. Cooling from both sides of the product treated rather than from one side as illustrated in the last mentioned figures increases the freezing capacity materially since the freezing area is augmented and the heat escapes through a shorter path through the product. Freezing is completed at a rate roughly proportional to the inverse second power of the thickness of the material through which heat must escape.

To obtain good results certain requirements must be met as to design and operation of the extrusion nozzle. Since there is almost nothing pertinent in the literature at present concerning the subject of the behavior of a frozen complex material when frozen in and forced through a confining canal, some of my findings which have been ascertained by test will be given here.

Included in FIGS. 9 and 12 are illustrations of how freezing progresses within the cold tube. Since liquid can be forced in through entry pipes 93, 93*a*, either continuously or in a pulsating fashion, the freezing situation arising from the former is shown in FIG. 9 and from the latter in FIG. 12.

Liquid entering narrow pipe 93 at any temperature resulting in fluidity, as shown in FIG. 9, is permitted to fill an unrefrigerated portion 105 of the freezing tube before entering the refrigerated portion surrounded by jacket 91. The temperatures are maintained so that no freezing in contact with walls is permitted except where the bore is uniform, since once frozen solid, the material should act as a piston permitting close fitting but easy sliding egress. A slight taper can be permitted in the freezing canal but is not necessary in most instances.

Freezing occurs by loss of heat to the refrigerated portion of the confining walls and the deposition thereupon of ice crystals and frozen material. The frozen layers grow in thickness away from the cooling walls.

Now it will be observed that the incoming liquid 104 cannot exert appreciable force upon the growing deposit of frozen material 107 until a solid plug has been formed so as to act as a piston. Until this time, the incoming liquid acts only upon a previously-formed constriction and forces this constriction forward as a piston. Therefore, when a new constriction forms, there must necessarily exist between the new and old constriction a trapped portion 108 of unfrozen liquid. This trapped liquid 108 will then proceed at the same rate as the constriction while solidifying. It is apparent that input speed and temperature should be controlled so that the trapped liquid 108 does not reach the end of the freezing region before sufficiently hardening. For maximum heat transfer, therefore, the region of trapped liquid should reach the end of the refrigerated region just after the liquid has been suitably frozen; this requires that the input should be maintained at such a speed that a new constriction occurs about when the previous piston has reached half the length of the refrigerated region. This, of course, pertains only when continuous input and output are desired.

When the input is of a pulsating nature freezing occurs in the manner shown in FIG. 12. Heat transfer is maximum when freezing is accomplished over a maximum area and this is accomplished, in this case, by causing the whole canal to freeze as a single solid piston and then quickly extruding this plug as fas as possible to do so safely without permitting the premature escape of unfrozen liquid. When extrusion is made into a vacuum, and especially when the temperature of the refrigerant is only moderately low, a solid plug of one or two inches or more should always be maintained in the freezing canal, otherwise liquid may break through.

In FIGS. 9 and 12, the confining cylinder is shown as having a thin-walled section at 106 and 106*a* between the jacket 91, 91*a*, and the plane of support by the vacuum vessel wall 96. This is to minimize unnecessary heat transfer from the surroundings to the refrigerated region. A very effective insulator is provided by a wall section of 1/16 inch thickness and an inch or so of length, especially if the wall material is of low conductivity such as stainless steel or other nickel alloy. Of course, other methods of insulation can be used, but the above arrangement is very effective.

For any given substance there is a more or less critical temperature below which it is unprofitable to reduce the temperature of the refrigerant. This temperature varies greatly with the constitution of the substance and is best ascertained by test in the following manner. Liquid is introduced into a freezing nozzle such as shown in FIG. 9, for example, and a definite input rate thereafter is maintained. The temperature of the refrigerant is at first held at a temperature only slightly below the freezing point, and after equilibrium has been reached, the hydraulic pressure required for extrusion is recorded. The temperature of the refrigerant is next set at a lower level and the hydraulic pressure again recorded. This is repeated at successively lower temperatures, until the hydraulic pressure rises to a point beyond which it is not practical to proceed. A graph is then made to refer the hydraulic pressure against the depression of the refrigerant below the freezing point. It will be observed that whereas the hydraulic pressure required increases at first slowly, as the temperature is further depressed a temperature region is reached where the hydraulic pressure increases very rapidly with small decreases of temperature, that is, exponentially rather than in a more or less linear fashion.

Since heat is transferred mainly from a liquid medium at about the freezing point and deposited in the refrigerant, the heat transfer is directly proportional to this temperature interval. Heat transfer is also proportional to the area of the heat transfer wall.

It is evident that the hydraulic pressure required is proportional to roughly the first power of the area of the frozen material sliding against the walls. Therefore, it becomes evident that, whenever the hydraulic pressure must be limited, as is the usual case, to a definite upper value which is reasonably practical, and whenever maximum freezing capacity is required consistent with this limitation, then the temperature should not be reduced below the region where extrusion resistance increases rapidly, say as the second, third or higher power of the temperature interval mentioned above. This is because when this temperature has been reached the optimum benefit to heat transfer through depression of refrigerant temperature has been reached, and any further increase in pressure being permitted, heat transfer can thereafter be best augmented by an increase in length of the freezing canal since pressure goes up linearly with this increase.

The refrigerant temperature must necessarily be always low enough to assure the requisite rigidity to the product, but usually adequate rigidity is reached at a temperature somewhat above the critical region described above. Another limitation to temperature when the frozen material is extruded directly into a region of high vacuum; this is that the temperature of the extrusion should never be lower than the temperature of pure ice in equilibrium with the vapor pressure prevailing. Otherwise condensations upon the extrusion and cold nozzle will occur.

For illustration, an example taken from actual tests with a device very similar to that of FIGS. 12 and 13 will be given. The apparatus used was a cylinder having a smooth bore of 1.0 inch diameter, within which was coaxially mounted a smooth round core rod of 5/8 inch diameter. The tube was cooled for about 10 inches of length by alcohol circulated at a controlled temperature. Liquid orange juice, in one case, was introduced in a pulsating fashion by a small hand pump.

It was found that when the refrigerant temperature was held at 0 degrees F., a peak hydraulic pressure of about 900 pounds per square inch was required to cause extrusion. At −20 degrees F., about 1700 pounds per square inch was required, and between −20 and −30 degrees F., the pressure mounted rapidly beyond the ability of the apparatus and an estimated 3000 pounds pressure or over was indicated. A critical temperature region, therefore, was established for the product, in this case the juice of very ripe oranges, to be in the neighborhood of —20 degrees F., or say —12 degrees to —25 degrees F.

At —20 degrees F. the juice was frozen to a hard friable solidness. It could be safely extended into a vacuum chamber at the rate of about 2 inches per minute or more. This productive capacity could have been more than doubled if the core also had been cooled by refrigerant.

Two methods for combining the benefits of the above described improved heating and freezing methods will now be given so as to indicate how these improvements can be utilized effectively in freeze-drying.

Figures 15, 16, 17:
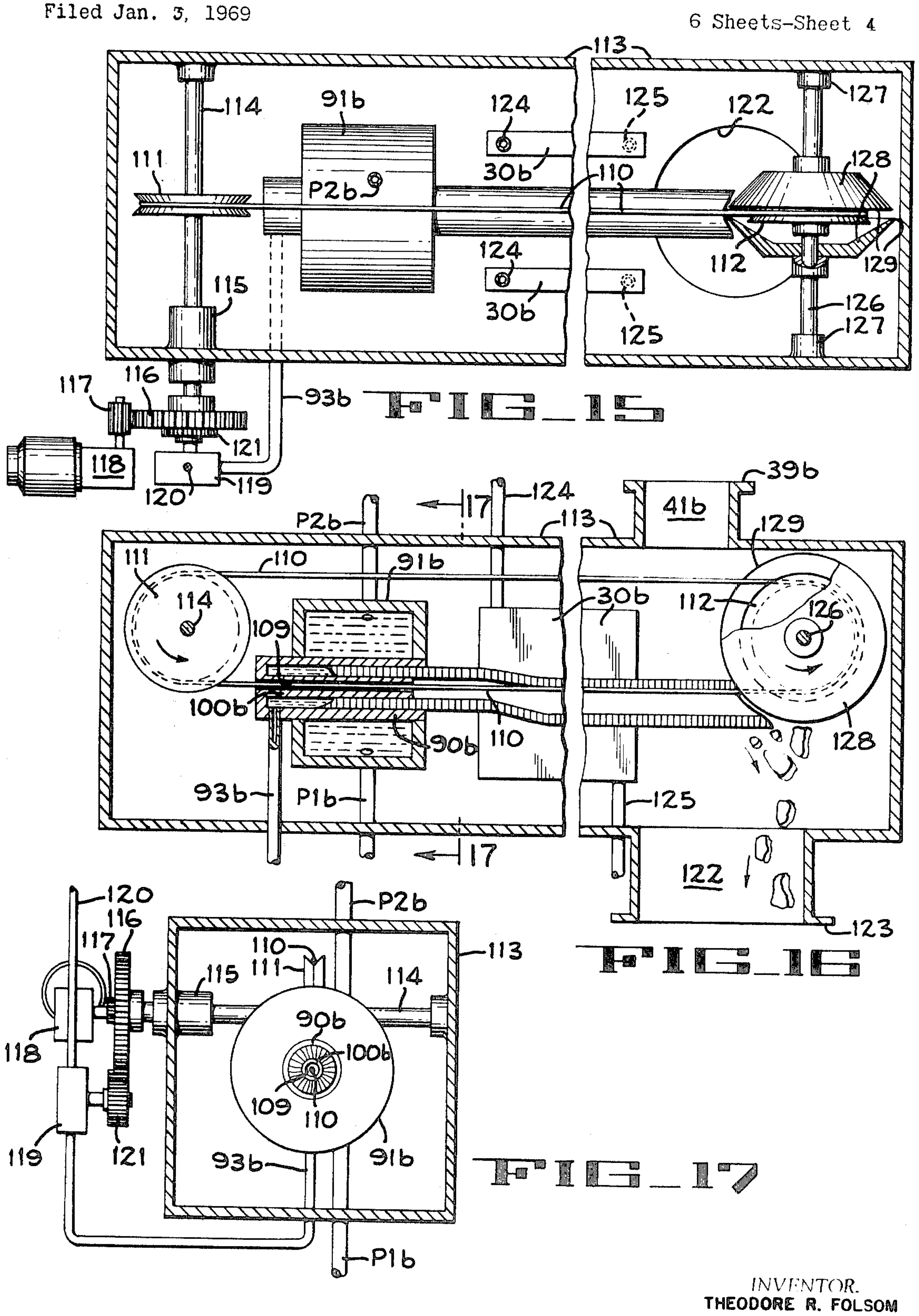
FIG. 15 shows in plan a device similar to the device of FIG. 9 except with a wire through the core rod.
FIG. 16 is a side view of the device of FIG. 15.
FIG. 17 is a view taken on the line 17—17 of FIG. 16.

The apparatus of FIGS. 15, 16 and 17 makes use of a freezing nozzle similar to that illustrated in FIGS. 12 and 13, with the addition that the coaxial core rod **100*b* has a hole 109 drilled entirely through its length in the axis permitting a wire 110, which constitutes a carrier for the tubular frozen substance, to be threaded through as shown. This wire is endless and is stretched tight between, and passes over, grooved pulleys 111 and 112. Rotation of pulley 111 in the sense shown in FIG. 16 causes wire 110 to move through the hole 109** in a direction from left to right.

In this instance the freezing tube **90*b* and refrigerating jacket 91*b* are suspended entirely within the vacuum chamber 113, and liquid is brought in through pipe 93*b* and refrigerant in through pipe P1*b* and out through pipe P2*b***.

Pulley 111 is fixed to shaft 114 which passes out of the vacuum chamber through a stuffing box 115 and is rotated by gear 116, which, in turn, is driven by gear 117. The gear 117 is driven by a slow speed motor 118 with reduction gearing.

A hydraulic pump 119, preferably having adjustable volumetric delivery, is driven from gear 121 running against gear 116.

Two parallel heating plates **30*b* are equally spaced in each side of the plane of the traveling wire 110. Steam or hot water may be passed through canals in these plates, entering by pipe 124 and leaving by pipe 125**. The heating plates should be good radiators and meet the requirements set forth above.

Pulley 112 is fast to shaft 126 supported by bearings 127. Also fastened to shaft 126, and equally spaced on either side of pulley 112 ,are two dished wheels 128, having opposing concavities and knife edges 129 spaced just far enough apart to permit wire 110 to pass. Dished wheels 128 rotate with pulley 112.

Liquid to be treated is supplied to pipe 120, forced by pump 119 through pipe **93*b*, into freezing cylinder 90*b*. A tubular frozen extrusion is formed and emerges to the vacuum having wire 110 threading it. The speed of the wire 110 is chosen so as to cause the extrusion to be carried without appreciable sliding away from the nozzle and pass between the heating plates 30. The speed of the wire and liquid input is chosen so that the desired dehydration occurs before the extrusion reaches the edges of disks 128. Upon slacking the rotating dished wheels 128, the dried material is stripped from the wire and falls through duct 122 leading to a suitable exit storage tank, reprocessing apparatus, or exit device which is attached at flange 123**.

The vapor evolved escapes through pipe **41*b* to a suitable vacuum system attached at flange 39*b***.

The apparatus just described has been illustrated in schematic simplicity for the sake of clarity of disclosure. It is apparent that considerable modification is possible. What has been attempted here is to show one arrangement where a conveyor of great simplicity can be used for proper exposure in a continuous process. The apparatus illustrated within chamber 113 of FIGS. 15, 16 and 17 can be considered one element, which can be multiplied to produce a drying machine having a high productive capacity per unit of chamber space. By providing a multiplicity of heating plates, and by conveying a multiplicity of extrusions between adjacent plates, the chamber space is efficiently utilized.

It should be clear that the carrier does not necessarily penetrate the freezing cylinder, and it is obvious that extrusion of many other shapes such as sheets and rods can be extruded into conveyors passing between the heating plates and supporting the frozen material on screens, wires, prongs, or other members permitting good exposure.

The clean-off wheels 128 may be replaced or augmented by knives, brushes or scrapers, either moving or stationary. A pulsating pump may be used instead of one giving continuous delivery. In fact, better exposure of a tubular extrusion may be had if the extrusion is exposed in short lengths permitting easy escape from the inside walls. This modification can be had by providing a suitable shearing knife, actuated, say, by a cam in shaft 114, and so mounted that the extrusions are sheared into short lengths before being exposed to heat. The heating cycle can best be controlled, as recommended above, by using a series of heating plates held at different temperatures instead of the single pair of plates 30 shown ni FIG. 15.

Figures 18, 19, 20:
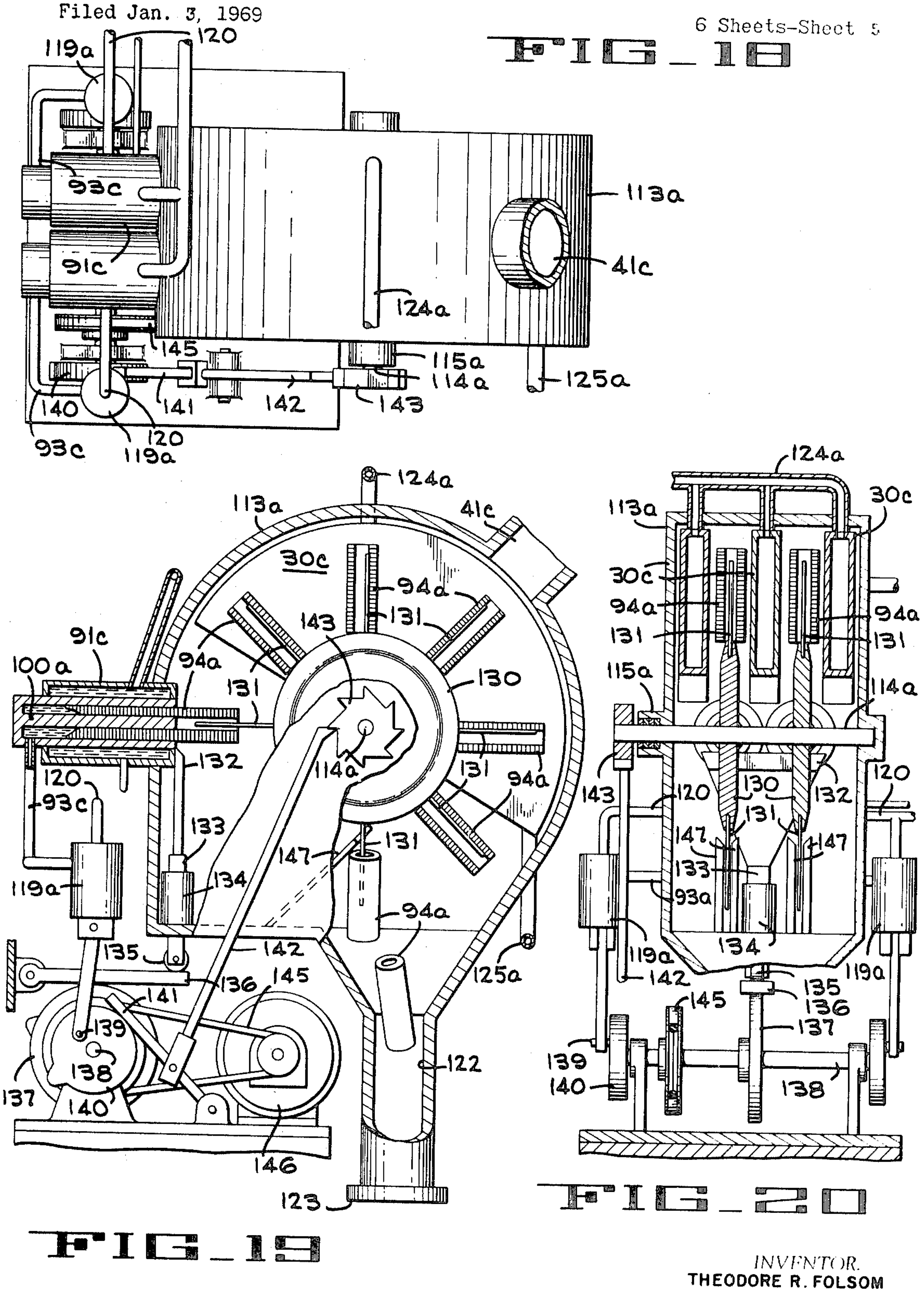
FIG. 18 is a view in plan of another embodiment of freeze drying apparatus.
FIG. 19 is a side view, partly in cross-section, of the device of FIG. 18.
FIG. 20 is an end view, partly in cross-section, of the device of FIG. 18.

In FIGS. 18, 19 and 20, there is shown, in a partially schematic fashion, another form of freeze dryer utilizing the teachings set forth above. Two freezing and drying elements are illustrated to indicate how a multiplicity of such elements, or similar elements, can be utilized to advantage.

Cylindrical vacuum chamber **113*a* is provided with an axial rotatable shaft 114*a* passing out of the end of the chamber through stuffing box 115*a*. Fxed to shaft 114*a* are two thin edged discs 130 defining a carrier for substance extruded into the chamber. Eight slender equally spaced prongs 131 are fixed radically in the thin edge of the discs 130** to receive the frozen substance.

The prongs 131, when rotated by shaft **114*a*, pass between parallel and semicircular shaped heating plates 30*c* during part of the revolution of the prongs. The heating plates are provided with cavities or canals for the circulation of a heated fluid entering at pipe 124*a* and leaving at pipe 125*a***.

Two freezing nozzles similar to that shown in FIG. 12 are mounted horizontally so that their open ends project into the vacuum chamber, and are coaxial with a pair of prongs when the latter are in the left hand horizontal position. In this case the nozzles are supported by joining their jackets **91*c* to the vessel wall 113*a* through which they penetrate. Since a coaxial core 100*a* is provided, tubular extrusions 94*a*** are produced.

A flat knife 132 is fixed in such a position that the extrusions can be sheared off in lengths after these have been threaded over the prongs 131. Knife 132 is lifted across the nozzle orifice by push rod 133 passing out of the vacuum through stuffing box 134 and acted upon by lever 136 through roller 135. Lever 136 is displaced at the proper time by cam 137 rotating with shaft 138.

Shaft 138 also revolves crank pins 139 actuating hydraulic piston pumps **119*a* and causes cam 140 to displace cam following lever 141 and pawl rod 142, which in turn rotates ratchet wheel 143** one-eighth revolution.

The liquid to be processed enters the pumps through pipes 120 and is forced through pipes **93*c*** to the freezing nozzles.

A suitable drive and motor is provided to rotate shaft 138 very slowly. Such a drive is indicated schematically by V-belt pulley belt 145 and low speed gear motor 146.

When shaft 138 is slowly rotated, extrusions are formed, threaded over the prongs, passed between the heating plates, and finally, when suitably dried, are swept off the prongs as the prongs pass between closely spaced parallel forks 147. The dried material falls through duct 122 into a suitable storage, reprocessing, or vacuum exit device attached at flange 123. The vapor and gases are removed by a suitable pumping system attached at pipe **41*c***.

During drying, the tubes **94*a* are supported by line-contact with the thin edged disk 130 and internal line contact with prongs 131. Good exposure results, but this can be improved upon, if the requirements justify it, by providing means for rotating the suspended tubes 94***a* to slowly rotate about their own axis while being exposed. The tubes may be spaced much closer together than implied by FIG. 19, a spacing of equal to the diameter of the tube is acceptable, especially if the tubes are rotated around their own axes.

Completely continuous operation can be had if continuous removal from the vacuum is arranged for. This can be done, for example, by joining to the apparatus of FIGS. 16 and 19 an air locking device, similar to that shown in my U.S. Pat. 2,411,152, which can be joined vacuum tight to flange 123 in FIG. 19. In this event, all valves and passages should preferably be designed to pass the dried material in convenient sized pieces, and this has been found easy to accomplish in actual practice. This technique can be modified, when granular final product is preferred, by interposing a tumbling, agitating, or comminuting device within the vacuum and between the drying apparatus of FIGS. 16 or 19 and the exit device just described. By application also of suitable heat, final dehydration can be carried out effectively in this interposed treatment zone in a manner indicated in my patent U.S. 2,411,152.

Completely automatic operation can be provided for, when the various moving members of the exit device, such as that described in my patent, are operated in suitably timed sequence and in synchronism with the motion of the conveyor or the hydraulic pump. If, in addition, it is required that the material be removed in sealed containers, sealed under a vacuum or a preferred gas, a mechanism for introducing the packages to the air locking chamber, sealing these, and removing them from this chamber should be provided and automatically operated in obvious sequence and in synchronism with the air locking device.

Figures 21, 22:
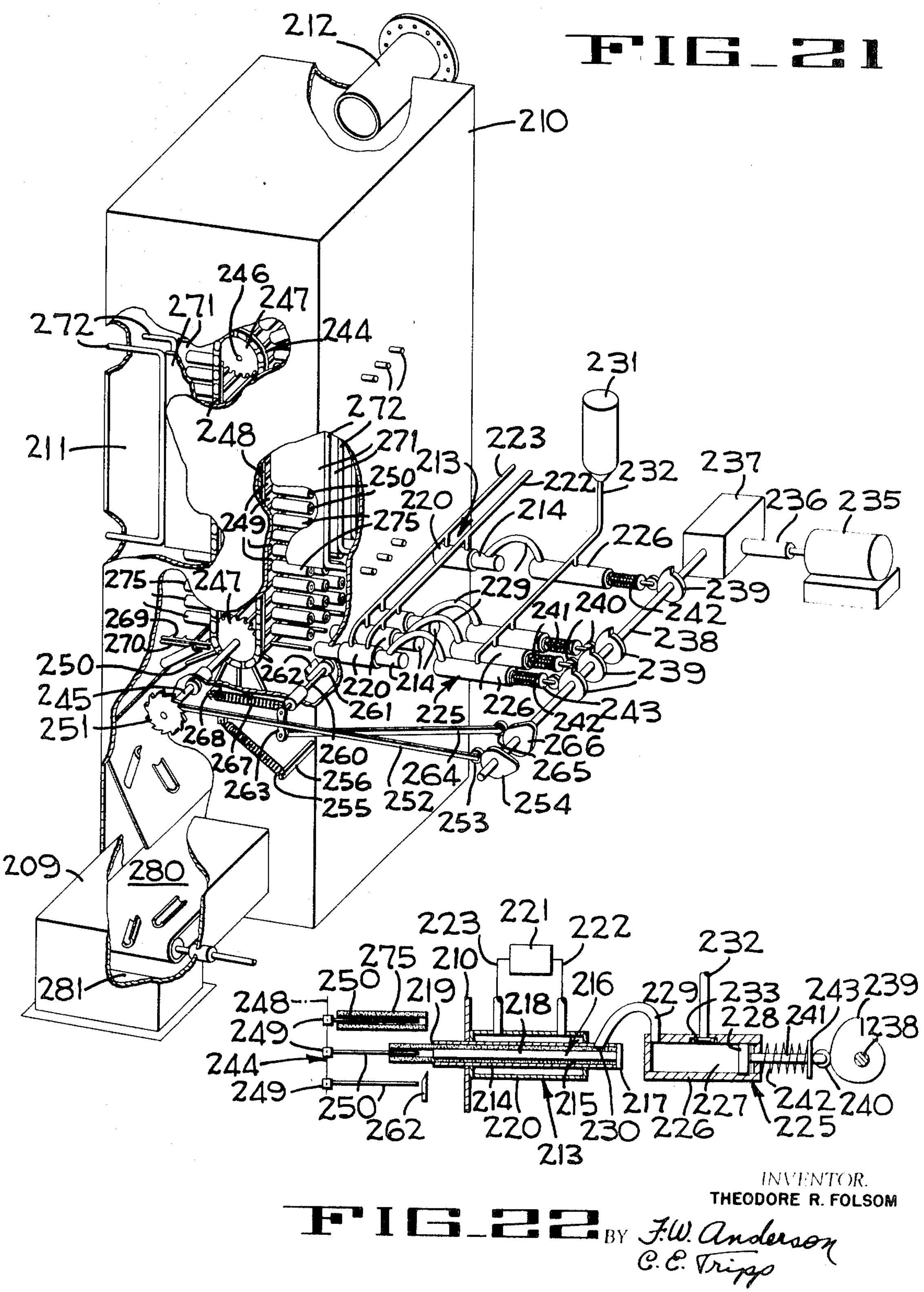
FIG. 21 is a view in perspective of apparatus embodying a different embodiment of the invention (with obvious supporting structure omitted for clarity)
FIG. 22 is a view in cross-section of a part of the apparatus of FIG. 21.

In the embodiment shown in FIGS. 21 and 22, a housing 210 has a vacuum chamber 211 therein which is connected by duct 209 and exhaust pipe 212 to other parts of a vacuum system (not shown). Chamber 211 is maintained at a low pressure (as, for example, 1 mm. of Hg) for freeze drying frozen substance, such as orange juice. A plurality of heat exchangers 213 (only four of which are shown for simplification and clarity of the drawing) have cylinders 214 which extend through the front wall of housing 210, each cylinder 214 having a freeze chamber 215 (see FIG. 2) which terminates inside the vacuum chamber 211. A core 216 is received in each chamber 215. Each core 216 has a head 217 secured to the outer, or right hand end (as viewed in FIG. 2) of the cylinder to close that end, and has a cantilevered shank 218 which extends inwardly, or to the left (as viewed in FIG. 2), from the head, terminating at the inner end of chamber 215. The inner end of chamber 215, and the inner end of the shank of the core 216, define an annular opening 219 into the vacuum chamber 211.

Liquid orange juice received in the chamber 215 is frozen therein into a tubular mass which continuously fills the opening 219 to prevent a loss of vacuum in chamber 211. Since a liquid having some ice crystals formed therein (that is, slush), as well as a liquid with no ice crystals yet formed therein can be received in the chamber for freezing in the present invention, it will be understood that where liquid is referred to in the specification and claims, that term will include liquid with or without ice crystals therein. Each heat exchanger 213 has a jacket 220 surrounding the cylinder 214. Conventional refrigerating apparatus, indicated at 221, is connected to each jacket by delivery line 222 and return line 223. The capacity of the refrigerating apparatus should be sufficient to maintain the inner end of the cylinder 214 below 0° F. because, above that temperature, the frozen mass of orange juice is too plastic to act as a sealing plug. The inner end of the cylinder 214 must be maintained sufficiently above the dew point temperature of the vapor inside the chamber to avoid condensation and accumulation of ice on the freeze cylinder. For example, when the vapor pressure in chamber 11 is maintained at 0.5 mm. Hg, the inner end of the freeze cylinder should not be allowed to fall below −12° F. If the inner end of cylinder 214 is maintained at this temperature, condensation will be avoided, the substance will be sufficiently solid to seal the passage defined by chamber 215 against entry of air, and the extruded frozen orange juice will have sufficient mechanical strength for transport through the vacuum chamber.

A plurality of pumps 225, one for each heat exchanger, each has a cylinder 226 with a pump chamber 227 which slidably receives piston 228. The pump chambers 227 of the pumps are connected, respectively, by passages 229 with inlet openings 230 in the freeze chambers 215. A container 231 for a liquid food substance, such as orange juice, is connected to the pump chambers 227 by supply line 232. The chamber 227 has a check valve 233 therein which consists of a hinged plate spring biased to normally close line 232 (see FIG. 2). When the pressure in line 232 exceeds the pressure in chamber 227 by a predetermined amount (as when piston 228 retracts) juice will flow through check valve 233 into chamber 227.

A motor 235 has a motor shaft 236 connected to a speed reducer 237 which slowly rotates a cam shaft 238. For each pump 225, there is mounted on shaft 238 a cam 239 which engages a roller 240. Rollers 240 are mounted, respectively, on connecting rods 241, each of which is connected to one of the pistons 228 of pumps 225. A spring 242, received on each connecting rod 241 between a collar 243 and cylinder 226, maintains each roller 240 in engagement with a cam 239.

Two parallel shafts 245, 246 inside vacuum chamber 211 are journaled in the side walls of housing 210. Each has two spaced sprockets 247 mounted thereon in chamber 211. A web 244 is received on the sprockets to extend vertically between the shafts 245, 246. The web comprises two spaced apart endless chains 248 and parallel, spaced apart, horizontal bars 249 connected between links on the two chains. Each bar has spaced, slender rods 250 mounted thereon perpendicular to the bars. The web 244 therefore defines, at any given instant, matrices of vertical and horizontal rows of rods 250 extending forwardly and rearwardly. The shaft 245 has a ratchet wheel 251 secured thereon outside the housing 210 which is rotated counterclockwise (as viewed in FIG. 1) by a bar 252 which has a pawl at one end to engage the ratchet wheel and a roller 253 at the opposite end. The roller 253 is held in engagement with cam 254 by a spring 255 connected at one end to a bar 256 secured to the housing 210 and connected at the opposite end to bar 252.

A shaft 260 is journaled in the side walls of housing 210. The shaft 260 extends through chamber 211 parallel to the shafts 245, 246 and close to the ends of cylinders 214. A bracket 261 is mounted on shaft 260 inside the housing 210 opposite the end of each cylinder 214, and a knife 262 is secured to the end of each bracket 261. Outside the housing 210, the shaft 260 has a link 263 mounted thereon which is connected to bar 264. Bar 264 has a roller 265 at the end opposite link 263 which is held in engagement with cam 266 by a spring 267 connected at one end to link 263 and connected at the opposite end to a lug 268 secured to housing 210.

A stationary knife 269 and a stripping rod 270 are mounted on the rear wall of housing 210 inside the chamber 211 for each vertical row of rods 250.

Inside chamber 211 a plurality of vertical heating plates 271 are positioned between the vertical rows of rods 250. Tubing 272 is connected to each plate, and warm water is circulated through the tubing to heat the plates.

It will be noted that supporting structure for many parts including motor 235, speed reducer 237, cam shaft 238, pumps 225, and bars 252, 264 has been omitted from the drawings for the clarification thereof.

In operation, liquid orange juice from container 231 flows into chambers 227 of pumps 225 as the pistons 228 therein move to the right (as viewed in FIG. 2). As cam shaft 238 rotates, the pistons are forced to the left, and the liquid (which cannot escape through line 232 because of check valve 233) flows under high pressure through passages 229 into freeze chambers 215 of heat exchangers 213.

Refrigerant is continuously circulated through the jackets 220 of the heat exchangers and liquid in chambers 215 is continuously freezing. Since liquid under pressure is continuously supplied through inlet opening 230 of freeze chamber 215, frozen substance is continuously extruded from the discharge ends of the chambers 215 through opening 219 into the chamber 211. At any given time, the freeze chamber 215 contains frozen orange juice at the inner, or left hand, end (as viewed in FIG. 2), liquid orange juice at the outer, or right end (as viewed in FIG. 2), and, between the frozen and liquid substance, there is present slush in which ice crystals are forming. Because of the core 216 in each chamber 215, the frozen substance is extruded as a solidly frozen tube. Thus, the chamber 215 defines a passage communicating with the vacuum chamber 211, the passage having an inlet 230 outside the chamber 211 and a discharge opening 219 into the chamber 211. Despite continued extrusion of the frozen substance, frozen substance is always present in the passage to seal the vacuum chamber to prevent the entry of air therein because additional liquid is continuously added and frozen.

Rotation of cam shaft 238 intermittently rotates ratchet wheel 251 to intermittently rotate shaft 245 and sprockets 247. Thus, web 244 moves in increments to carry the rods 250 in steps along paths between the vertical heater plates 271. The rods pass by the ends of cylinders 214, and each rod stops at an opening 219 to receive the frozen tube extruded therefrom. Before the rods at the openings 219 are stepped away from the openings, the knives 262 are swung upwardly, by the action of cam 266 on bar 264, to cut the tubes. As the rods at the openings 219 subsequently move upwardly, they carry tubular segments 275 of frozen substance. Thus, it will be seen that the cams on cam shaft 238 are positioned to provide, on each rotation of shaft 238, the following sequence: first, liquid is forced into freeze chamber 215 to force solidly frozen tubular portions out openings 219; next, knives 262 swing to cut off the frozen tube portions extruded through openings 219; and, finally the rods are stepped upwardly in increments to bring the next horizontal row of rods 250, which are empty, into registration with openings 219.

The rods carry the tube segments, which have a greater surface area for quicker drying than solid shafts of frozen material, up between heating plates, over shaft 246, and down between heating plates to a discharge area. The vapor produced from the tubular segments flows to the exhaust pipe 212. The heating plates promote vaporization to dry the frozen tube segments, but, because of the highly insulating properties of the vacuum space, do not thaw the product. Preferably, the plates 271 are coated with a material of high emissivity such as organic lacquer or ceramic enamel and provide an efficient use of radiant energy to dry a large quantity of frozen material uniformly. The heating plates may be made in sections, one directly above the other, to provide a desired sequence of temperatures, chosen to produce the minimum total drying time, as drying progesses.

The knives 269, which are positioned in the discharge area out of, but close to, the paths of the rods 250, engage the tubular segments 275 and sever the segments. The stripper rods 270, which are also out of but close to the path of the rods 250, engage the severed tubular segments to assure they break apart and fall off the rods 250. The severed tube segments fall to a conveyor 280 inside the housing 210 which carries them to an opening 281. Opening 281 leads to another part of the vacuum system where the additional drying of the food segments takes place to render the product stable at room temperature.

It is apparent that the freezing technique disclosed above has useful purpose other than as an effective element in a freeze-drying process. For example, the method is adaptable to quick freezing of foods and the like, especially package goods. The possible benefits from this method are many, especially when proper emphasis is placed on technique and, therefore, some observations will be described below.

With suitable apparatus, a large class of substances may be processed; in general, any freezable substance permitting confinement in a narrow freezing canal under pressure may be processed.

The geometry of the freezing canal can be chosen to suit the requirements for the preferred shape of the final frozen object, or to suit the requirements for convenient and economical packaging. For example, rectangular extensions can be made for packaging in rectangular packages, and cylindrical, tubular or other shaped extensions can be made for cylindrical packages such as tin cans or other convenient packages.

Since, for this purpose, it is generally desirable to emphasize large productive capacity and greatest economy, some recommendations for design and operation of apparatus will be made toward this end. Already above it has been pointed out that a critical temperature region exists below which it is preferable not to reduce the temperature of the substance unless necessary for hardening purposes. The observation has been made that freezing capacity can be effectively made high by use of extended area of cooling surface and the use of freezing canals as long as possible with the available hydraulic pressures. It might be pointed out that adequate hardness can be attained with most foods, such as fruit juices, at moderately low temperatures, such as 0 degrees F. plus or minus 10 degrees F., and that at these temperatures hydraulic pressures to be expected are not excessive generally less than 1000 pounds per square inch, and refrigeration at these temperatures is most economical with cooling systems readily available in commerce.

It is to be emphasized here that without the use of excessively expensive low refrigerant temperatures, the extrusion freezing method can provide extremely efficient heat transfer and therefore high productive efficiency per unit of cooling surface area; and at the same time the method provides means for including sanitary automatic operation, convenience, and applicability to the use of cheap and effective packages.

The preferable means for attaining high productive capacity and efficiency for quick freezing purposes includes the production of the frozen material in the form of thin frozen lamina in such a shape that the lamina are combinable to form an aggregate shape which will effectively fill the desired package. A salient reason for the choice of this technique is that the time required to freeze a body of liquid of a given thickness varies roughly as the inverse square of this thickness, while the hydraulic pressure required to extend the frozen material increases only as the inverse first power of the thickness. Therefore, large capacity can best be attained by the use of a multiplicity of freezing canals each forming thin extrusions combinable to form the required aggregate thickness.

For example, a rectangular package can be filled with a number of thin slabs of frozen material formed by extrusion from a canal having rectangular cross-section with one dimension much smaller than the other. For example, a package 4 inches by 4 inches by 2 inches can be filled by four, four inch lengths of one-half inch thick ribbon extrusions or eight one-quarter inch thick ribbons, of equal length. For the same hydraulic pressure, which datum usually is the practical limitation to operation, the last mentioned example would be about twice as productive per unit freezing area, as would the previous example. Cost of apparatus varies roughly at the freezing area.

It can be seen that conventional cylindrical tin cans can be readily filled by inserting in them a number of lengths of thin walled tubular extrusions of several telescoping diameters. A small solid central core can be used.

Actual tests have been made with a freezing nozzle producing rectangular frozen ribbons 9⁄32 inch thick by 4½ inches wide. The effective length of the freezing canal was about seven inches and the refrigerant temperature in one instance was about 0 degrees F. Extrusion of frozen fruit juices could be made at about 4 inches per minute and pressures well below 1000 pounds per square inch could be used in many instances, sometimes below 100 pounds per square inch. It was estimated that the same apparatus could have been made much more productive if the refrigerating system had been improved. With very thin extrusions, heat transfer out of the treated substance becomes so good that equally good heat transfer must be provided in the cooling walls and refrigeration system.

It has been found that frozen extrusions can be made with dimensional tolerance of a few thousandths of an inch, and lengths can be cut off rapidly and cleanly. Therefore, complete fill of packages and considerable saving in package material can be realized. Cheaper package material can be utilized.

The thermal conductivity of ice is several times better than that of water. Once seeded with ice crystals, a solution solidifies by the growth of these crystals. It is possible in a device similar to the ordinary ice cream freezer to reduce many liquid foods and the like to a slush containing fifty percent or more of the moisture in the form of ice crystals, while still retaining sufficient plasticity to permit extrusion freezing in the manner taught in the foregoing.

It is therefore evident that a maximum productive capacity can be obtained from an extrusion freezing device when it is supplied with an already partly frozen or seeded fluid material, say from a continuous freezer of the type customarily used in the ice cream industry. The pipes leading to the extrusion freezer, the valves and pump should, of course, be of a type and size permitting the passage of ice crystals and should be refrigerated or insulated. It might be pointed out that the texture and crystal structure of the final extruded product can be controlled by controlled seeding in this manner, since otherwise only a crystal structure consisting of slender ice needles normal to the surface of the extrusions can be expected. In some instances grandular crystal structure is desirable, and this can be provided by seeding.

In any event, precooling to the neighborhood of the freezing point can be most profitably done prior to the arrival of the liquid to the extrusion freezer. This is partially because the most rapid and economical heat transfer can be made from a fluid by the utilization of some sort of agitation.

Extrusion freezing offers benefits other than those arising from use with the freeze-drying art and that of the quick freezing of foods. Many of these will be apparent to those versed in the art.

It has been found, for example, that this novel form of freezing permits novel improvements to the appearance and sales appeal of frozen products. For example, by combining thin extruded laminae, prepared as above mentioned, having more than one color, flavor, or other property, appealing novelty products can be produced, having uniqueness in the distinct and sharp manner in which the constituents are separated. As another example, extrusions having an appealing "marbled" appearance can be produced by supplying a single freezing canal with input streams of more than one composition, either alternately or simultaneously introduced. As a final example; by the use of a suitable core in the extrusion nozzle, the cavity produced by it in the extrusion can be made to serve a useful purpose, such for example as providing a perfect wall for the insertion of a stick when a section of the extrusion is used as a frozen confection.

Although the best mode contemplated for carrying out the present invention has been herein shown and described, it will be apparent that modification and variation may be made without departing from what is regarded to be the subject matter of the invention as set forth in the appended claims. For example, the present invention is particularly suitable for the freeze drying of organic compositions and especially foods, biologicals and pharmaceuticals, such as blood plasma, lemon powder, yeast, gelatine, agar, milk, coffee, etc., and the like.

Having completed a detailed description of the invention so that those skilled in the art could practice the same, I claim:

1. Apparatus for introducing a substance initially in liquid form through an opening into a vacuum chamber comprising:

(a) a heat exchanger having a freeze chamber terminating at said opening, said freeze chamber having a core therein,
(b) means to circulate a refrigerant through the heat exchanger to freeze liquid substance received in the freeze chamber into a tube of frozen substance,
(c) means to extrude the frozen tube of substance through said opening into the vacuum chamber,
(d) means to cut segments off the frozen tube as it is extruded through said opening, and
(e) a conveyor in the vacuum chamber having rods to receive the frozen tube segments.

2. Apparatus for introducing a substance initially in liquid form through openings into a vacuum chamber comprising:

(a) a plurality of heat exchangers, each having a freeze chamber terminating at one of said openings, each freeze chamber having a core therein and each having an inlet opening outside the vacuum chamber,
(b) a plurality of pumps each connected to the inlet opening of one of said freeze chambers to pump liquid substance continuously therein under high pressure,
(c) means to circulate refrigerant through the heat exchangers to freeze the liquid substance in the freeze chambers thereof into a plurality of frozen tubes, said frozen tubes extruded through said openings into the vacuum chamber by the continuous flow of liquid under pressure into the freeze chambers,
(d) a knife in the vacuum chamber to sever segments of tubing as it is extruded into the vacuum chamber,
(e) a carrier in the vacuum chamber having a plurality of rods to receive the severed tube segments, and
(f) a plurality of parallel heater plates in the vacuum chamber straddling the path of the rods.

3. In an apparatus for producing predetermined frozen substance suitable for freeze drying, the improvement comprising a refrigerated cylinder, an elongated core mounted inside said cylinder, hydraulic means for introducing a substance in at least a partially liquid form into one end of said cylinder at controlled rates to force said substance in a hard frozen hollow cylindrical form from the other end of said cylinder, and a member to extend inside said hollow frozen substance to support said substance while said substance is further conveyed and processed.

4. The apparatus of claim 3 in which said member is the sole support for said substance whereby said substance is contacted only on its inner surface.

5. The apparatus of claim 3 including means to cut said hollow shaped substance into tubular segments.

6. The apparatus of claim 3 in which said supporting member is a rod received inside said hollow substance.

7. In an apparatus for converting a substance that is initially partially liquid to a hard frozen form suitable for freeze drying, the improvement comprising:

(a) a freezing cylinder maintained by external refrigerating means at a temperature below the temperature at which said substance becomes hard frozen, (b) means for forcing said substance into one end of said freezing cylinder at a controlled rate so that a hard frozen extrusion emits at the other end, (c) means including a slender support member for automatically conveying the hard frozen extruded material away from the freezing cylinder while being supported upon said slender support member, said support member of small cross-sectional area to define an effective heat insulator.

8. The apparatus of claim 7 including means for automatically cutting off the hard frozen extrusion at predetermined lengths after they emit from the freezing cylinder.

9. The apparatus of claim 7 where the forcing means is a hydraulic pump.

10. The apparatus of claim 7 where a cylindrical core member is provided inside the freezing cylinders so as to produce a hollow extrusion, said core member being at least as long as the freezing cylinder.

11. The apparatus of claim 7 including a cylindrical core member fixed inside the freezing cylinder so as to produce thin hollow hard frozen extrusions, said core member being parallel to said freezing cylinder and said core member being at least as long as said freezing cylinder.

12. The apparatus of claim 7 including a cylindrical core member, and means to circulate a low temperature refrigerant inside said core member to maintain the core member at a low temperature.

13. The apparatus of claim 7 including a core member for producing a concave surface in the hard frozen extrusion and a member supporting said hard frozen extrusion by making contact with an interior concave surface produced by said core member.

14. The apparatus of claim 1 including a core member inside the freezing cylinder to produce a hollow cavity in the hard frozen extrusion, and a support member contacting a surface of said hollow cavity after the hard frozen extrusion has been formed so that said extrusion may be conveyed for further processing.

15. The method of introducing a substance through an opening in a vacuum chamber without losing the vacuum in said chamber comprising the steps of freezing the substance, extruding the frozen substance with an annular cross-section through the opening into the vacuum chamber, with said substance filling the opening, and receiving the frozen substance on a prong for movement relative to a heating plate.

16. Apparatus for introducing a substance initially in liquid form through openings into a vacuum chamber comprising:

(a) a plurality of heat exchangers, each having a freeze chamber terminating at one of said openings, each freeze chamber having an inlet opening outside the vacuum chamber and each freeze chamber having a core extending therethrough, (b) a pump connected to the inlet opening of each freeze chamber to pump liquid substance continuously therein under high pressure.

(c) means to circulate refrigerant through the heat exchangers to freeze liquid substance pumped into the freeze chambers thereof, said frozen substance in each freeze chamber forced through said opening into the vacuum chamber in tubular form by the continuous flow of liquid under pressure into the freeze chambers, (d) a knife inside the vacuum chamber to sever the tubes into segments, (e) a heater inside the vacuum chamber, and (f) a carrier inside the vacuum chamber having prongs to loosely receive the segments for transport past the heater.

17. Apparatus for freeze drying a large quantity of hollow segments comprising in combination a freeze drying vacuum chamber having a plurality of openings, a freeze chamber in communication with each of said openings, said freeze chambers having cores, means to freeze the food substance in each freeze chamber to form frozen hollow segments, means to extrude said frozen substance through said openings while sealing said openings against loss of vacuum in said chamber, means to convey said segments from each opening along a path in said vacuum chamber, said conveying means including a plurality of members received in said frozen hollow segments, and means to heat said segments as they move along said paths.

18. Apparatus for freeze drying a large quantity of hollow segments comprising in combination a freeze drying vacuum chamber having a plurality of openings, a freeze chamber in communication with each of said openings, said freeze chambers having cores, means to freeze the food substance in each freeze chamber to form frozen hollow segments, means to extrude said successive frozen segments through said openings while sealing said openings against loss of vacuum in said chamber, means to convey said segments from each opening along a path in said vacuum chamber, said conveying means including a plurality of members received in said frozen hollow segments, a group of said members received in successive segments from each opening, and means to heat said segments as they move along said paths.

19. Apparatus for freeze drying a large quantity of hollow segments comprising in combination a freeze drying vacuum chamber having a plurality of openings, a freeze chamber in communication with each of said openings, said freeze chambers having cores, means to freeze the food substance in each freeze chamber to form frozen hollow segments, means to extrude said successive frozen segments through said openings while sealing said openings against loss of vacuum in said chamber, means to convey said segments from each opening along a path in said vacuum chamber, said conveying means including a plurality of members received in said frozen hollow segments, a group of said segments received in successive segments from each opening, and means to heat said segments as they move along said paths, said heating means including heating plates positioned alternately with said groups of members to dry the frozen hollow segments received on the members.

20. The method of freeze drying a substance in which ice crystals form at low temperature, said ice crystals freezing hard at somewhat lower temperature comprising:

(a) forcing said substance at a controlled rate under pressure into one end of a smooth refrigerated freezing cylinder that is maintained below the hardening temperature of said substance, said cylinder having a core so that a hard hollow frozen extrusion emits from the other end.

(b) conveying said hard frozen extrusions to a region within a vacuum chamber provided with extensive heated surfaces, (c) suspending said hollow extrusion openly upon a slender prong that transmits little heat, (d) exposing said frozen extrusions near said heating surfaces but without their touching said heating surfaces, (e) maintaining a vacuum in said vacuum chamber low enough and for a period sufficient to dehydrate said substance in the frozen state.

21. The method of freeze drying a substance in which ice crystals form at low temperature, said ice crystals freezing hard at somewhat lower temperature comprising:

(a) forcing said substance at a controlled rate under pressure into one end of a smooth refrigerated freezing cylinder that is maintained below the hardening temperature of said substance, said cylinder having a core so that a hard hollow frozen extrusion emits from the other end.

(b) conveying said hard frozen extrusions to a region within a vacuum chamber provided with extensive heated surfaces, (c) suspending said hollow extrusions openly upon a plurality of prongs that transmit little heat, (d) exposing said frozen extrusions near said heating surfaces but without their touching said heating surfaces, (e) maintaining a vacuum in said vacuum chamber low enough and for a period sufficient to dehydrate said substance in the frozen state.

22. The method of freeze drying a substance in which ice crystals form at low temperature, said ice crystals freezing hard at somewhat lower temperature comprising:

(a) forcing said substance at a controlled rate under pressure into one end of a smooth refrigerated freezing cylinder that is maintained below the hardening temperature of said substance so that a hard frozen extrusion emits from the other end, (b) conveying said hard frozen extrusion to a region within a vacuum chamber provided with extensive heated surfaces, (c) suspending said extrusions by a plurality of elongated wires that transmit little heat, said wires penetrating the freezing cylinders completely and also penetrating the frozen extrusions while said extrusions are exposed to heat and vacuum, (d) exposing said frozen extrusions near said heating surfaces but without their touching said heating surfaces, (e) maintaining a vacuum in said vacuum chamber low enough and for a period sufficient to dehydrate said substance in the frozen state.

23. The method of freze drying a substance in which ice crystals form at low temperature, said ice crystals freezing hard at somewhat lower temperature comprising:

(a) forcing said substance at a controlled rate under pressure into one end of a smooth refrigerated freezing cylinder that is maintained below the hardening temperature of said substance so that a hard frozen extrusion emits from the other end, (b) conveying said hard frozen extrusions to a region with a vacuum chamber provided with extensive heated surfaces, (c) suspending said extrusion openly upon insulating supporting members that transmit little heat, (d) exposing said suspended frozen extrusions near said heating surfaces but without their touching said heating surfaces, said extrusions suspended by a support member that contacts a surface inside a cavity formed in the extrusion during the hardening of said extrusions, and (e) maintaining a vacuum in said vacuum chamber low enough and for a period sufficient to dehydrate said substance in the frozen state.

References Cited

UNITED STATES PATENTS

| | | | |
|---|---|---|---|
| 2,639,594 | 5/1953 | Watt | 62—354 |
| 3,247,677 | 4/1966 | Bussell | 62—352X |
| 3,270,428 | 9/1966 | Van Olphen | 34—5X |
| 3,469,411 | 9/1969 | Silva | 62—1X |
| 3,477,137 | 11/1969 | Van Gelder | 34—5 |
| 3,482,326 | 12/1969 | Brewster | 34—5 |
| 3,430,454 | 3/1969 | Ginnette et al. | 34—242 |
| 3,218,731 | 11/1965 | Stinchfield | 34—242X |
| 3,430,454 | 3/1969 | Ginnette et al. | 34—242X |

WILLIAM E. WAYNER, Primary Examiner

U.S. Cl. X.R.

34—92, 242; 62—345

PO-1050
(5/69)

UNITED STATES PATENT OFFICE
CERTIFICATE OF CORRECTION

Patent No. 3,583,075 Dated June 8, 1971

Inventor(s) THEODORE R. FOLSOM

It is certified that error appears in the above-identified patent and that said Letters Patent are hereby corrected as shown below:

Column 3, line 31: change "construction" to -- constructing --.
Column 3, line 42: change "lengths" to -- legs --.

Column 9, line 28: change "millimteters" to -- millimeters --.
Column 9, line 33: after "the" (second occurrence) add -- ice --.
Column 9, line 64: change "or" to -- for --.
Column 10, line 32: change "ich" to -- inch --.
Column 11, line 52: change "promotive" to -- primitive --.
Column 11, line 55: change "goine" to -- gone --.
Column 13, line 50: change "previsously" to -- previously --.
Column 14, line 53: after "through" (2nd occurrence) insert -- pipe--.
Column 25, line 46: change "1" to -- 7 --.
Column 28, line 16: change "supporting" to -- support --.

Signed and sealed this 6th day of June 1972.

(SEAL)
Attest:

EDWARD M.FLETCHER,JR.
Attesting Officer

ROBERT GOTTSCHALK
Commissioner of Patents